(12) United States Patent
Willcocks et al.

(10) Patent No.: US 6,391,356 B1
(45) Date of Patent: *May 21, 2002

(54) METHODS OF PROCESSING CHOCOLATES AT LOW VISCOSITIES AND/OR AT ELEVATED TEMPERATURES USING SEEDING AGENTS AND PRODUCTS PRODUCED BY SAME

(75) Inventors: Neil A. Willcocks, Columbia, NJ (US); Thomas M. Collins, Nazareth, PA (US); Frank W. Earis, Maidenhead (GB); Ralph D. Lee, Hampton, NJ (US); Arun V. Shastry, Somerset, NJ (US); Kevin L. Rabinovitch, Kinnelon, NJ (US); William Harding, Maidenhead (GB)

(73) Assignee: Mars, Incorporated, McLean, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/782,903

(22) Filed: Jan. 11, 1997

(51) Int. Cl.[7] .................................................. A23G 1/00
(52) U.S. Cl. ....................... 426/306; 426/307; 426/601; 426/607; 426/610; 426/613; 426/660; 426/515
(58) Field of Search ................................. 426/660, 601, 426/607, 610, 613, 306, 307, 515; 554/211

(56) References Cited

U.S. PATENT DOCUMENTS

| | | | | | |
|---|---|---|---|---|---|
| 2,487,931 | A | * | 11/1949 | Lataner | 99/23 |
| 3,270,040 | A | * | 8/1966 | Bradshaw et al. | 260/410.7 |
| 4,032,667 | A | * | 6/1977 | Kreuter | 426/306 |
| 4,283,436 | A | * | 8/1981 | Sueters et al. | 426/607 |
| 4,369,200 | A | * | 1/1983 | Iwao et al. | 426/660 |
| 4,396,633 | A | * | 8/1983 | Iresser | 426/100 |
| 4,426,042 | A | * | 1/1984 | Kaupert | 426/515 |
| 4,446,166 | A | * | 5/1984 | Giddey et al. | 426/631 |
| 4,543,262 | A | * | 9/1985 | Michnowski | 426/306 |
| 4,701,337 | A | * | 10/1987 | Frost et al. | 426/548 |
| 4,839,192 | A | * | 6/1989 | Sagi et al. | 426/607 |
| 4,859,483 | A | * | 8/1989 | Sollich | 426/519 |
| 4,865,856 | A | * | 9/1989 | Groen | 426/231 |
| 4,877,636 | A | * | 10/1989 | Koyano et al. | 426/607 |
| 4,882,176 | A | * | 11/1989 | Koyama et al. | 426/5 |

(List continued on next page.)

FOREIGN PATENT DOCUMENTS

EP 0496310 7/1992
JP H7[1995]-39307 2/1995

OTHER PUBLICATIONS

Minifie, "Chocolate, Cocoa and Confectionery: Science and Technology" $2^{nd}$ ed. AVI Pub. Co. pp. 142–174, 1980.*

Hachiya, I., et al. "Seeding Effects on Solidification Behavior of Coca Butter and Dark Chocolate. I. Kinetics of Solidification", JAOCS, vol. 66, No. 12, pp. 1757–1762 (Dec. 1989).

Reidel, H.R., "Chocalate Couvertures and Coatings", Confectionery Production, vol. 41, No. 4, pp. 169 & 210 (1975).

Koyano, T. et al. "Fat polymorphism and crystal seedings on fat bloom stability of dark chocolate", Food structure. vol. 9. pp. 231–240 (1990).

Hachiya, I. et al. "Seeding Effects on Solidification Behavior of Coca Butter and Dark Chocolate. II. Physical Properties of Dark Chocolate". JAOCS, vol. 66, No. 12, pp. 1763–1770 (Dec. 1989).

Primary Examiner—Cynthia L. Nessler

(57) ABSTRACT

Methods of making chocolates that minimize the dramatic increases in viscosity typically associated with tempered chocolate. The invention also relates to the ability to process chocolates at higher temperatures without the need to temper at low temperatures.

41 Claims, 12 Drawing Sheets

U.S. PATENT DOCUMENTS

| | | | | |
|---|---|---|---|---|
| 4,888,196 A | * | 12/1989 | Ehrman et al. | 426/601 |
| 4,910,037 A | * | 3/1990 | Sagi et al. | 426/601 |
| 5,023,102 A | * | 6/1991 | Given, Jr. | 426/610 |
| 5,023,106 A | * | 6/1991 | Ehrman et al. | 426/660 |
| 5,032,418 A | * | 7/1991 | Sollich | 426/520 |
| 5,108,769 A | * | 4/1992 | Kincs | 426/93 |
| 5,188,853 A | * | 2/1993 | Sollich | 426/231 |
| 5,188,858 A | * | 2/1993 | Stipp et al. | 426/531 |
| 5,264,234 A | * | 11/1993 | Windhab et al. | 426/519 |
| 5,275,835 A | * | 1/1994 | Masterson et al. | 426/660 |
| 5,324,533 A | * | 6/1994 | Cain et al. | 426/607 |
| 5,342,644 A | * | 8/1994 | Cain et al. | 426/660 |
| 5,354,572 A | * | 10/1994 | Miller et al. | 426/580 |
| 5,464,649 A | * | 11/1995 | St. John et al. | 426/660 |
| H1527 H | * | 4/1996 | Moore | 426/660 |
| 5,514,390 A | * | 5/1996 | Aasted | 426/231 |
| 5,599,574 A | * | 2/1997 | Guskey et al. | 426/660 |
| 5,635,230 A | * | 6/1997 | Aasted | 426/138 |
| 5,690,985 A | * | 11/1997 | Van Meeteren et al. | 426/601 |
| 5,705,217 A | * | 1/1998 | Aasted | 426/512 |
| 5,709,896 A | * | 1/1998 | Hartigan et al. | 426/103 |

* cited by examiner

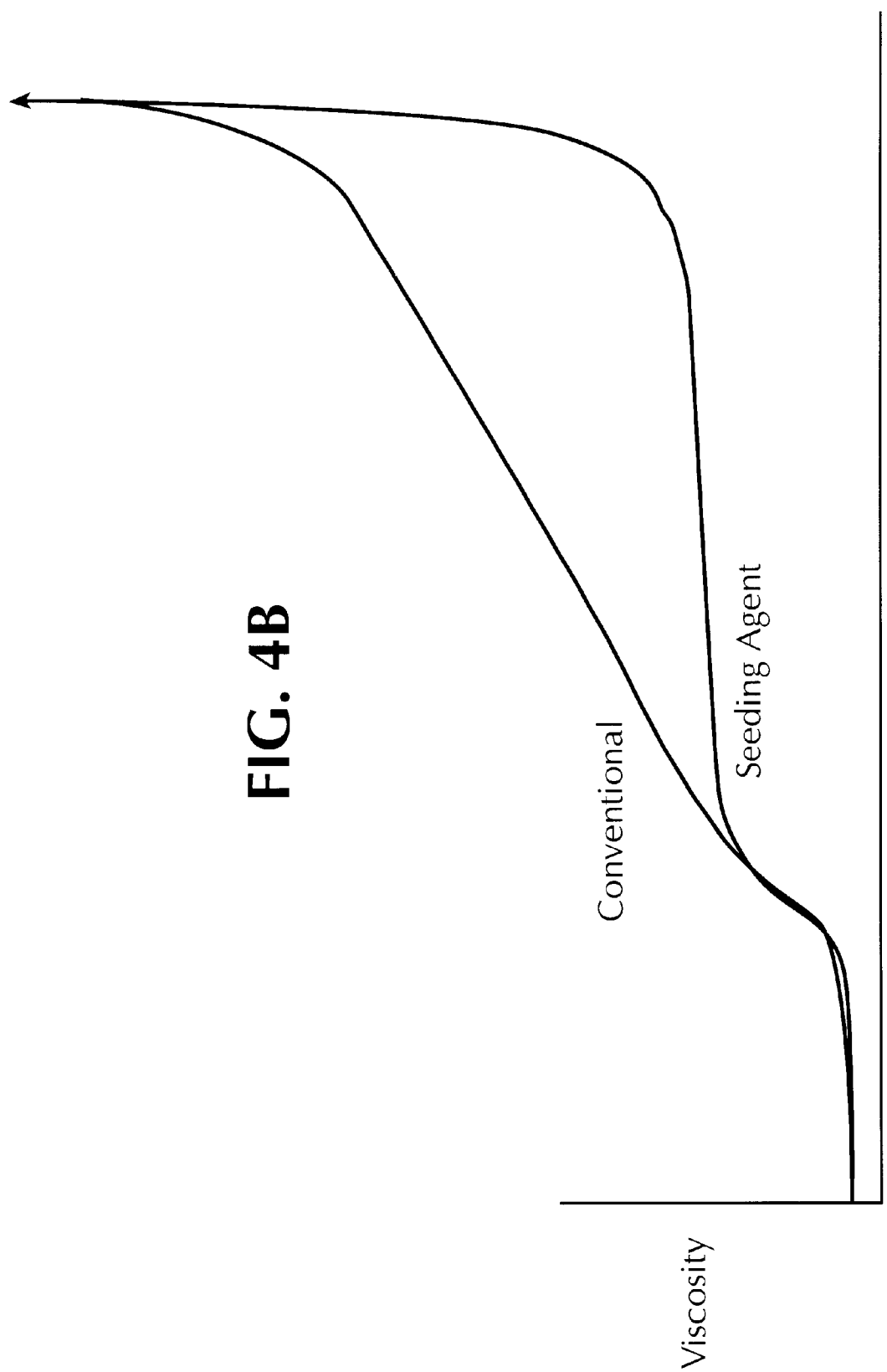

METHODS OF PROCESSING CHOCOLATES AT LOW VISCOSITIES AND/OR AT ELEVATED TEMPERATURES USING SEEDING AGENTS AND PRODUCTS PRODUCED BY SAME

BACKGROUND OF THE INVENTION

1. Field of the Invention

This invention relates to methods of processing chocolates and products produced using the same. More specifically, the invention relates to methods of processing tempered chocolates at higher temperatures and/or without the detrimental increases in apparent viscosity typically associated with the processing of tempered chocolates. In addition, the invention relates to improved products made according to the processing method.

2. Description of the Related Art

Documents and references which pertain to the field of this invention or are otherwise relevant to the practice of the invention are cited in this disclosure with a full citation for each. Each citation is hereby incorporated by reference.

Chocolate confection have a very distinct taste and mouthfeel that have been enjoyed by individuals for many years. The unique flavor and mouthfeel of chocolate is a result of the combinations of its numerous components as well as its process of manufacture.

Chocolate contains solids particles dispersed throughout a fat matrix. The term "fat" includes, for example, cocoa butter and milk fat. Similarly, chocolate-like compositions may also contain fats other than, or in combination with, cocoa butter. Accordingly, melted chocolate and chocolate-like compositions are suspensions of non-fat particles, e.g., sugar, milk powders and cocoa solids, in a continuous liquid fat phase. The fat phase of milk chocolate, for example, is typically a mixture of cocoa butter, a suitable emulsifier and milk fat with cocoa butter being typically the predominant fat in the chocolate.

Cocoa butter is solid at room temperature (21°–24° C.). Accordingly, chocolate is firm and solid at room temperature thereby providing good "snap" at initial bite as well as resistance to deformation and/or surface marking. Above room temperature, the fat phase melts progressively until completely melted at about 36° C. Therefore, chocolate is typically fully melted at body temperature (about 37° C.). This rapid melting in the mouth at the body temperature provides the smooth, creamy mouthfeel which results in a strong flavor impact.

Cocoa butter, however, is a polymorphic material in that it has the ability to crystallize in a number of different crystal packing configurations (Wille and Lutton, "Polymorphism of Cocoa Butter", *J. Am. Oil Chem. Soc.*, Vol. 43 (1966) pages 491–96). Six different polymorphic forms are generally recognized for cocoa butter. Forms I and II are produced, for example, by rapidly cooling melted untempered chocolate to low temperatures and are very unstable and have a lower melting point. Forms III and IV melt at higher temperatures than Forms I and II but are not the most desirous forms for confectionery manufacture. Forms V and VI are the most stable forms of cocoa butter. It is desirable to have Form V as the predominant form in a well-tempered chocolate. Form V may transform slowly into Form VI after a period of time. Accordingly, chocolate processing is strongly linked to the crystallization and polymorphic behavior of the fat phase. Before chocolate can be satisfactorily processed from liquid to finished solid confection using conventional methods, it must be tempered after which it is gently cooled in order to form a set chocolate having a stable fat phase.

Before the development of tempering machines, this process was carried out by pouring the chocolate onto a marble slab and working it with a flexible spatula until it began to thicken. At this point both stable and unstable polymorphic forms were crystallized, and the thick "mush" was mixed into a bowl of warm chocolate to melt out the unstable crystals prior to use. At this stage the chocolate was tempered.

The most commonly used method for currently tempering chocolate typically involves the following sequential steps:

A. complete melting of the chocolate fat phase;

B. cooling to the point of initial crystallization of the fat phase (i.e., below the melting point of the liquid fat phase);

C. crystallizing a portion of the liquid fat phase to form stable and unstable fat crystals;

D. slight heating to melt out any unstable crystals that may have formed leaving from about 3 to 8 wt % as seeds for crystallizing the remaining liquid fat; and E. cooling to set the chocolate, typically in a cooling tunnel.

Accordingly, during conventional chocolate processing, the chocolate mixture is initially melted at temperatures of about 45° C. and tempered by cooling with agitation to about 29 to 30° C. The precise temperature-time profiles used when tempering a chocolate will vary depending on the recipe of the formulation, the tempering equipment and even the purpose for which the chocolate will be used. The tempering of the chocolate results in a chocolate dispersion having fat crystals dispersed throughout the liquid fat phase. The chocolate suspension may then be further processed prior to solidification, for example, by enrobing the chocolate onto an edible center or molding the chocolate into a shape or form. The chocolate is finally set into a sufficiently solid form for wrapping by gentle, controlled cooling.

Conventional tempering therefore is the controlled partial precrystallization of the fat phase which is believed to be necessary to produce a stable solid form of the fat in the finished product. It is an important object of tempering to develop a sufficient number of stable fat crystals so that under appropriate cooling conditions the fat phase of the chocolate is able to crystallize into a stable polymorphic form. Accordingly, the purpose of tempering is to ensure that the cocoa butter crystallizes in a stable form.

Since melted chocolate is a suspension of solid particles, e.g., sugar, milk powders and cocoa solids, in a continuous liquid fat phase of cocoa butter, chocolate suspensions have non-Newtonian flow behavior including the presence of a yield stress. The yield stress represents a minimum threshold of force that must be applied to a suspension, for example the force applied to toothpaste, in order to make it flow. Below this threshold, no flow occurs. The non-Newtonian behavior of chocolate is sometimes described by fitting the rheological data to the Casson equation which defines a Casson yield value and Casson plastic viscosity. This minimum force mentioned above is then referred to as the "Casson yield value". The "Casson plastic viscosity" approximates the work done to keep the suspension flowing uniformly. Alternatively, an apparent viscosity can be used to describe the flow behavior of chocolate.

A variety of factors influence the flow properties or the rheological behavior of chocolates. These factors include fat content, emulsifier content, moisture content, particle size distributions, particle shapes, temperature, conching conditions, including time and temperature of conching, and temper level.

To provide good flow properties, every particle dispersed in the chocolate suspension should be coated with fat. It is important that fat covers the surface of all or substantially all the solid particles to minimize the particle-particle interactions which reduce flow. Accordingly, the amount of flowing liquid phase in the suspension in relation to the amount of solid is a significant factor which influences the rheology of a suspension.

The rheological behavior of chocolate is important for manufacturing. Previous methods of maintaining a controlled viscosity during processing rely on careful control of the temperature of the chocolate as well as temper level. Many applications for chocolates require careful control of rheology. One example of such an application is "enrobing", the process of coating chocolate onto an edible center. Enrobing is accomplished when the chocolate is in a fluid-like state. Since enrobing is a coating application, it requires good flow properties to provide a high quality coating layer. For enrobing, proper yield value and viscosity must be maintained in order to produce a satisfactory coated product. Uncontrolled viscosity changes of an enrobing chocolate can be the cause of numerous processing problems. Poor flow properties may result in an improper or unsatisfactory coating of the food center which may result in product defects such as (a) the food center showing through the coating due to an uneven coating, (b) pits in the coating resulting from the fracture of air bubbles trapped while enrobing, (c) "wide feet" due to excess chocolate forming ridges at the edge surrounding the bottom portion of the product and (d) cracking. Such defects can result in the edible center drying out or becoming detrimentally oxidized. Furthermore, some defects result in flakes or chips of the solidified chocolate coating eventually fracturing off the product resulting in a chocolate product having a reduced coated weight of chocolate. These defects are discussed further below in relation to FIG. 16.

Moreover, if the viscosity of the chocolate increases too much while in the enrober or any other apparatus, it can become too thick for flow and cause solid chocolate build-up on enrober surfaces, and/or even "freeze" the enrober or any other apparatus. Alternatively, the temperature of the tempered chocolate may get too high, melting out any seed crystals in the composition and thus, resulting in a loss of temper. If the temper of the enrobing chocolate is lost through the melting of the seed crystals, the resultant coating will have poor qualities such as low resistance to fat bloom and potentially poor gloss.

As set forth above, the fat content of a chocolate composition influences the rheological properties of the composition. Decreasing the fat content will increase the viscosity all other factors being the same. A variety of methods have been developed to try to reduce the fat content in chocolate without increasing the viscosity of the chocolate to the point that it cannot by processed. Such methods for reducing the viscosity in chocolate formulations appear to focus on the non-fat particle/liquid interactions within the suspensions. These methods require the control of solid particle sizes, moisture level, fat absorption into the particles, surface characteristics of the particles, etc. Each of these factors are directed to reducing the amount of fat necessary to lubricate the chocolate suspension and provide good rheological properties. (See *Industrial Chocolate Manufacture and Use,* Second Ed., Edited by S. T. Beckett, article entitled "Chocolate Flow Properties" by J. Chevalley, at page 146; and an articles entitled "Influencing the Rheological Behavior of Chocolate Mass" by Dr. S. T. Beckett, presented at Penn. Manufacturing Confectioners' Assn., Volume XVI, No. 1, April. 1992).

U.S. Pat. No. 5,464,649 to St. John et al. relates to reduced fat chocolates having Theological flow properties associated with normal fat content chocolate. The patent discloses maintaining acceptable flow properties by controlling the surface area of the non-fat solid particles, reducing the absorption of liquid fat into these particles and decreasing the interactions between these particles.

It is well-known that increasing the surface area of the particles in a chocolate suspension increases the amount of liquid fat needed to maintain the same viscosity. Therefore, providing smoother or rounder particles decreases the amount of liquid fat necessary to maintain any given level of viscosity. Also, the absorption of liquid fat into the solid particles decreases the amount of liquid fat available for lubricating the suspension thereby also increasing viscosity. U.S. Pat. No. 5,464,649 relates to modifying the non-fat solids/liquid fat interactions of the chocolate suspension.

Temper level is an important factor that influences the viscosity of chocolate. As set forth above, the development of "temper" is a prerequisite for the production of good quality chocolate and is defined as the creation of stable cocoa butter seed crystals in the chocolate.

It is well-known that the viscosity of a suspension increases with decreasing liquid phase (*Industrial Chocolate Manufacture and Use,* Second Ed., Edited by S. T. Beckett, Article entitled "Chocolate Flow Properties" by J. Chevalley, at page 146). Moreover, viscosity is also increased by decreasing the temperature of a fluid suspension. That is, the viscosity of fluid suspensions decrease with increasing temperature.

Accordingly, increases in viscosity occur during conventional tempering since temper is induced by the partial pre-crystallization of cocoa butter through cooling. As a result of tempering, the amount of liquid phase is decreased as it partially solidifies and the amount of solid particles is increased, and, as a result, the viscosity is increased. The onset of pre-crystallization and the consequent increase in viscosity occurs when the melted chocolate is cooled to a temperature below the crystallization temperature of the liquid fat phase. The crystallization gradually continues until the chocolate is ultimately set by cooling. During tempering, a percentage of the liquid fat becomes solid, believed to be in the range of 3–8%. This results in an increase in viscosity since the amount of liquid phase is reduced and the amount of solid phase increased at the same time. FIG. 3 illustrates the viscosity increase that occurs during conventional tempering processes. Finally, to avoid melting out the cocoa butter seed crystals, tempered chocolate must be held at a lower temperature, e.g., 29–31° C., and this also increases viscosity. It is the combination of these factors which causes the viscosity to rise so dramatically during conventional chocolate tempering. As a result, higher levels of fat are necessary to ensure the viscosity of the chocolate does not progress beyond the point which renders the chocolate unworkable.

Moreover, since the chocolate suspension must be cooled for tempering, the viscosity also increases due to the lower temperatures. Accordingly, not only does tempering result in a change in rheology due to the formation of fat crystals at the expense of the liquid lubricating phase, but the rheology is also adversely affected by the low temperature used to induce and maintain an acceptable temper level.

U.S. Pat. No. 5,464,649 and the other cited references do not address the viscosity increases that result during conventional processing, particularly from tempering. In fact, the patent only discusses Casson yield and Casson plastic viscosity values taken at 40° C. for the rheological values of the chocolate formulations, i.e. when the fat phase is in a fully liquid state. Unfortunately, the control of the rheological properties of a fully melted chocolate, although well-known as being beneficial in improving the flow properties of the chocolate when being processed, only adjusts the starting point at which the viscosity will begin to increase during tempering. Such methods do not avoid or reduce the substantial viscosity increase typically encountered during the tempering of chocolates.

Moreover, since conventional tempering results in an increase in viscosity, the initial viscosity of the chocolate composition before tempering, the Casson plastic viscosity value for example, must be low enough to take into account the viscosity increases that occur during the tempering process. Otherwise, the tempered chocolate will thicken during tempering past the point where it can be used in processes such as enrobing, etc. During conventional tempering processes, since the chocolatier anticipates taking a substantial viscosity increase during tempering, the chocolate formulated must have a good initial viscosity.

Accordingly, the viscosity increases during conventional tempering result from the formation of seed crystals which increase the solid load, i.e., solid phase volume, of the chocolate. Moreover, the seed crystals are formed at the expense of the liquid fat which is the source of chocolate lubricity.

As discussed above, after the tempering is initiated using conventional methods, it becomes more and more difficult to pump the chocolate through processing apparatuses and mold into shapes or enrobe onto edible products. That is, once tempering is initiated, the viscosity of the chocolate increases making it more difficult to work. Furthermore, the increased viscosity of the chocolate makes it more difficult to form a high quality molded or enrobed product. If the chocolate is too thick, the molded products will typically contain air bubbles since they are unable to escape. Conversely, if chocolate having uncontrolled rheological variations is used for enrobing purposes, the enrobed product may be too thin, too thick and/or uneven. For example, when enrobing, the temper/viscosity is often adjusted to obtain the correct weight on the enrobed product. If the chocolate is too thick, the temperature of the composition must be increased to reduce viscosity, However, this may also decrease the temper. This results in longer cooling times and increases the chocolate susceptibility to bloom. (*Pennsylvania Manufacturing Confectioners Association: Research Notes,* Volume XVI, No. 1, April 1992, "Influencing the Rheological Behavior of Chocolate Mass" by Dr. S. T. Beckett).

The following references relate to the state of the art.

U.S. Pat. No. 4,446,166 to Giddey et al. relates to a heat-resistant chocolate article comprising a chocolate mass containing cocoa butter, sugar, milk solids and cocoa solids and, dispersed throughout the mass about 2 to 10 percent by weight of a water-in-fat emulsion, at least a portion of the fat being in solid form.

U.S. Pat. No. 4,910,037 to Sagi et al. relates to powdery tempering accelerators useful for omitting or simplifying the tempering operation in the production of oily compositions such as chocolate and a method of using the same. The tempering accelerators comprise a fat or oil containing a 1,3-saturated-2-unsaturated triglyceride. The accelerator can be prepared from a natural fat or oil such as cacao butter, mowrah butter, illipe butter, etc. The crystal is preferably Form V or more stable forms of cocoa butter. The powder particles can be obtained by spraying or pulverizing the solid fat under a low temperature atmosphere. An accelerator is added to the oily composition as the composition is solidified by cooling. The accelerators disclosed in the patent are intended to "rapidly" form stable crystals in the chocolate and are added to initiate and/or accelerate the solidification of the liquid fat phase in the chocolate composition.

U.S. Pat. No. 5,108,769 to Kincs relates to a fat component for confectionery coatings comprising a structured fat emulsion which can be incorporated directly into a confectionery coating composition when it is formulated and which will not thicken or set up until it passes through a cooling tunnel. The structured fat emulsion also raises the heat set properties of the confectionery coating in order to provide a finished product which exhibits the good eating quality of a low melt point fat, but enhanced heat resistance at normal temperatures. The fat component is a structured fat emulsion in which a polyol is emulsified and encapsulated into a partially hydrogenated fat.

The above-described methods fail to disclose methods which allow for the control of the rheological properties of chocolate formulations during tempering and/or the use of elevated temperatures during tempering. It would be highly advantageous to provide methods of tempering chocolates which allow for greater flexibility during processing while at the same time avoiding the careful temperature and temper level controls typically required during chocolate processing. Such methods would also reduce or eliminate the detrimental increases in viscosity that occur in conventional processing. Providing such methods would not only allow for easier, more flexible and more efficient methods of manufacture, but would also enable the development of new and advantageous method and product designs which would permit the use of previously unsuitable chocolate formulations, such as low fat formulations, in a greater variety chocolate applications.

OBJECTS OF THE INVENTION

It is an object of the invention to overcome the above-described difficulties in the related art.

It is another object of the invention to provide a method of processing chocolate compositions having a temperable fat phase without the detrimental increases in viscosity typically encountered with conventional chocolate processes.

It is still a further object of the invention to provide a method of processing chocolate compositions at elevated temperatures.

It is yet another object of the invention to provide a method of enrobing or molding or otherwise processing chocolate compositions having lower viscosities, particularly low fat formulations.

The foregoing and other objects and advantages of the invention will be set forth in or be apparent from the following description.

SUMMARY OF THE INVENTION

The present invention relates to improved methods of making chocolates that minimize the dramatic increases in viscosity typically associated with tempered chocolate. The invention also relates to the ability to process chocolates at higher temperatures without the need to temper at low temperatures.

One aspect of the invention relates to the use of seeding agents to provide temper without initiating the crystallization of the liquid fat phase that occurs during conventional tempering. Preferably, the use of seeding agents according to the invention actually postpones the crystallization of the fat phase. This enables the seeded chocolate to be used in a variety applications that require low viscosities, such as enrobing. The use of the seeded compositions in such applications allows for the manufacture of high quality products such as enrobed products having more uniform coatings with lower fat contents.

Another aspect of the invention relates to methods of maintaining seeded compositions at elevated temperatures without losing the temper induced by the addition of the seeding agents. If the temperature of the seeded composition is not brought below the solidification temperature of the fat phase, as in traditional tempering methods, the increase in viscosity due to cooling and/or maintaining the formulation at lower temperatures is avoided. Processing the seeded chocolate at higher temperatures also lowers the tempered chocolate viscosity. The seeded compositions can be maintained at higher temperatures as long as the processing temperatures are below the melting temperature of the seeding agent. As a result of the ability to process the seeded compositions at elevated temperatures, the chocolate can be further processed with an even lower viscosity value for any given chocolate formulation. After the further processing, i.e., enrobing, injection molding, etc., the chocolate is then solidified in a cooling apparatus as in normal chocolate processing.

The presently disclosed processes also result in reduced chocolate build-up problems in enrobers or other apparatus since the continual increase in viscosity during conventional tempering is avoided. The increase in viscosity results in the chocolate becoming increasingly difficult to work with as the tempering progresses.

Yet another aspect of the invention relates to methods of using seeding agents to introduce a controlled targeted level of temper in a chocolate composition at the low or ultra-low temper range. Since the additional tempering of the chocolate through crystal formation and/or crystal grain growth is postponed by maintaining the temperature of the seeded composition above the solidification temperature of the liquid phase, the amount of temper in the formulation is controlled by varying the amount of seeding agent added. This enables the formation of a wide range of temper levels including low temper and ultra low temper. Such chocolate formations can provide highly advantageous results when used in combination with rapid cooling processes such as even lower fat formulations.

A still further aspect of the invention relates to seeded chocolate formulations made according to the present invention having improved wetting characteristics and lower viscosity providing for thinner, more uniform coatings, improved injection molding, shell molding, tablet molding, introduction of tempered chocolate into panning processes, enhanced spin molding performance and broader product design options.

BRIEF DESCRIPTION OF THE DRAWINGS

Specific embodiments of the present invention will now be described further, by way of example, with reference to the accompanying drawings, in which:

FIG. 4(b) is a graphical representation of a comparative viscosity profile of chocolate produced by the conventional enrobing process and by the enrobing process according to the one embodiment of the present invention;

DEFINITIONS

1. Chocolate

Figure 1:
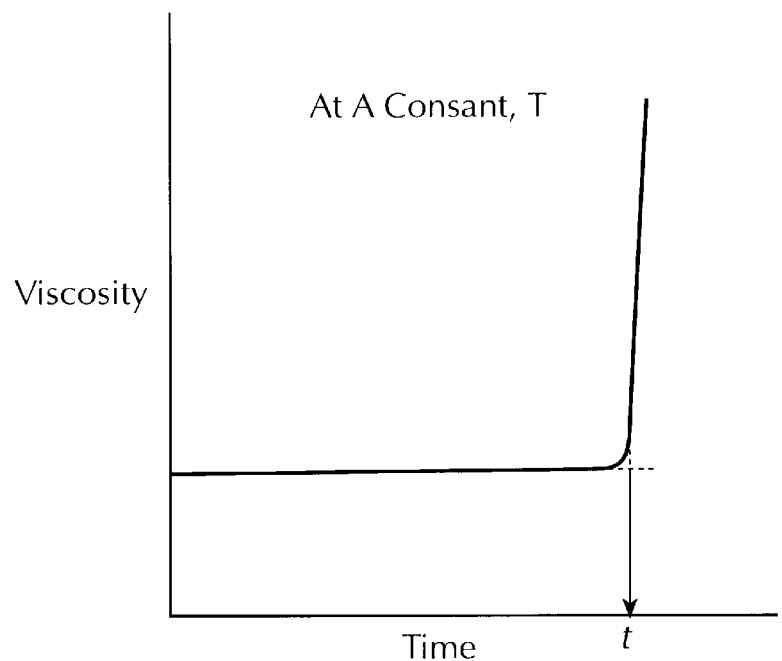
FIG. 1 is a graphical representation of a viscosity-time profile for a chocolate held at a constant temperature, T, which is used to determine the solidification temperature. The onset time, t, for the experimental increase in viscosity is determined by extrapolating the baseline and exponential increase portions of the curve to a point of intersection. The temperature, T, at which the onset time equals 1 hour is defined as the solidification temperature.

The term "chocolate" refers to all chocolate or chocolate-like compositions having a temperable fat phase. As the invention is directed to the control of the characteristics of the fat or fat-like phase of the chocolate, rather than the non-fat materials within the chocolate, the term is intended to include all chocolate and chocolate-like compositions that contain at least one cocoa or cocoa-like component in the temperable fat or temperable fat-like phase. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, non-standardized chocolates and chocolate-like compositions, unless specifically identified otherwise.

The fat phase of the chocolate of the present invention can include cocoa butter, milkfat, anhydrous milkfat, butteroil, and other fats or mixtures of cocoa butter with these other fats. See Minifie, 3rd Ed., pp. 100–109.

In the United States, chocolate is subject to a standard of identity established by the U.S. Food and Drug Administration (FDA) under the Federal Food, Drug and Cosmetic Act. Definitions and standards for the various types of chocolate are well established in the United States. Nonstandardized chocolates are those chocolates which have compositions which fall outside the specified ranges of the standardized chocolates.

Examples of nonstandardized chocolates result when the nutritive carbohydrate sweetener is replaced partially or completely; or when the cocoa butter or milkfat are replaced partially or completely; or when components that have flavors that imitate milk, butter or chocolate are added or other additions or deletions in formula are made outside the USFDA standards of identify of chocolate or combinations thereof.

The chocolate may contain a sugar substitute. The term "sugar substitute" includes bulking agents, sugar alcohols (polyols), or high potency sweeteners or combinations thereof. In an alternative embodiment of the present invention, a sugar substitute may partially replace the nutritive carbohydrate sweetener. The high potency sweeteners include aspartame, cyclamates, saccharin, acesulfame, neo-hesperidin dihydrochalcone, sucralose, alitame, stevia sweeteners, glycyrrhizin, thaumatin and the like and mixtures thereof. The preferred high potency sweeteners are aspartame, cyclamates, saccharin, and acesulfame-K. Examples of sugar alcohols may be any of those typically used in the art and include sorbitol, mannitol, xylitol, maltitol, isomalt, lactitol and the like.

The chocolates may also contain bulking agents. The term "bulking agents" as defined herein may be any of those typically used in the art and include polydextrose, cellulose and its derivatives, maltodextrin, gum arabic, and the like.

The chocolate products of the present invention may contain emulsifiers. Examples of safe and suitable emulsifiers may be any of those typically used in the art and include lecithin derived from vegetable sources such as soybean, safflower, corn, etc., fractionated lecithins enriched in either phosphatidyl choline or phosphatidyl ethanolamine or both, mono- and digylcerides, diacetyl tartaric acid esters of mono- and diglycerides (also referred to as DATEM), mono-sodium phosphate derivatives of mono- and diglycerides of edible fats or oils, sorbitan monostearate, hydroxylated lecithin, lactylated fatty acid esters of glycerol and propylene glycol, polyglycerol esters of fatty acids, propylene glycol mono- and diester of fats and fatty acids, or emulsifier that may become approved for the USFDA-defined soft candy category. In addition, other emulsifiers that can be used in the present invention, include polyglycerol polyricinoleate, ammonium salts of phosphatidic acid, sucrose esters, oat extract, etc., any emulsifier found to be suitable in chocolate or similar fat/solid system or any blend provided the total amount of emulsifier does not exceed 1% by weight. Emulsifiers preferred for use in the present invention are lecithin, fractionated lecithin, diacetyl tartaric acid esters of mono- and diglycerides (DATEM) or mixtures of these emulsifiers at a maximum level of 1% of any one emulsifier or any mixture of emulsifiers.

Nutritive carbohydrate sweeteners with varying degrees of sweetness intensity are useful in the present invention and may be any of those typically used in the art and include, but are not limited to, sucrose, e.g. from cane or beet, dextrose, fructose, lactose, maltose, glucose syrup solids, corn syrup solids, invert sugar, hydrolyzed lactose, honey, maple sugar, brown sugar, molasses and the like. The nutritive carbohydrate sweetener, preferably sucrose, will be present in the chocolate as crystals or particles.

2. Detrimental Crystallization

The term "detrimental crystallization" refers to that crystallization, through nucleation and/or crystal growth, that results in a significant increase in the viscosity of the chocolate composition irrespective of any temperature induced viscosity increases. Detrimental crystallization can also be described as the increase in apparent viscosity attributable to crystallization.

3. Solidification Temperature

The term "solidification temperature" as used herein, is defined as the temperature at which a chocolate composition, when held at the its solidification temperature, exponentially increases in viscosity after 1 hour at the solidification temperature. The time at which the chocolate composition held at a temperature (T) exponentially increases in viscosity is defined as the onset time of the exponential viscosity increase. This can be determined by using a device similar to that described by Koyano, T., Hachiya, I. and Sato K., "Fat Polymorphism and Crystal Seeding Effects on Fat Bloom Stability of Dark Chocolate", Food Structure, vol. 9 (1990) pp. 231–240 to record the change in flow behavior with time for a chocolate composition held at a temperature (T). FIG. 1 is a graphical representation of the relationship between viscosity and time at a specific constant temperature T for a specific chocolate composition. The exponentially increasing portion of the curve is extrapolated back to the point of intersection with the extrapolation of the baseline viscosity portion of the curve. The point of intersection defines the onset time. The solidification temperature is defined as the temperature at which the onset time is equal to one hour.

4. Seed Melting Temperature

Figure 9:
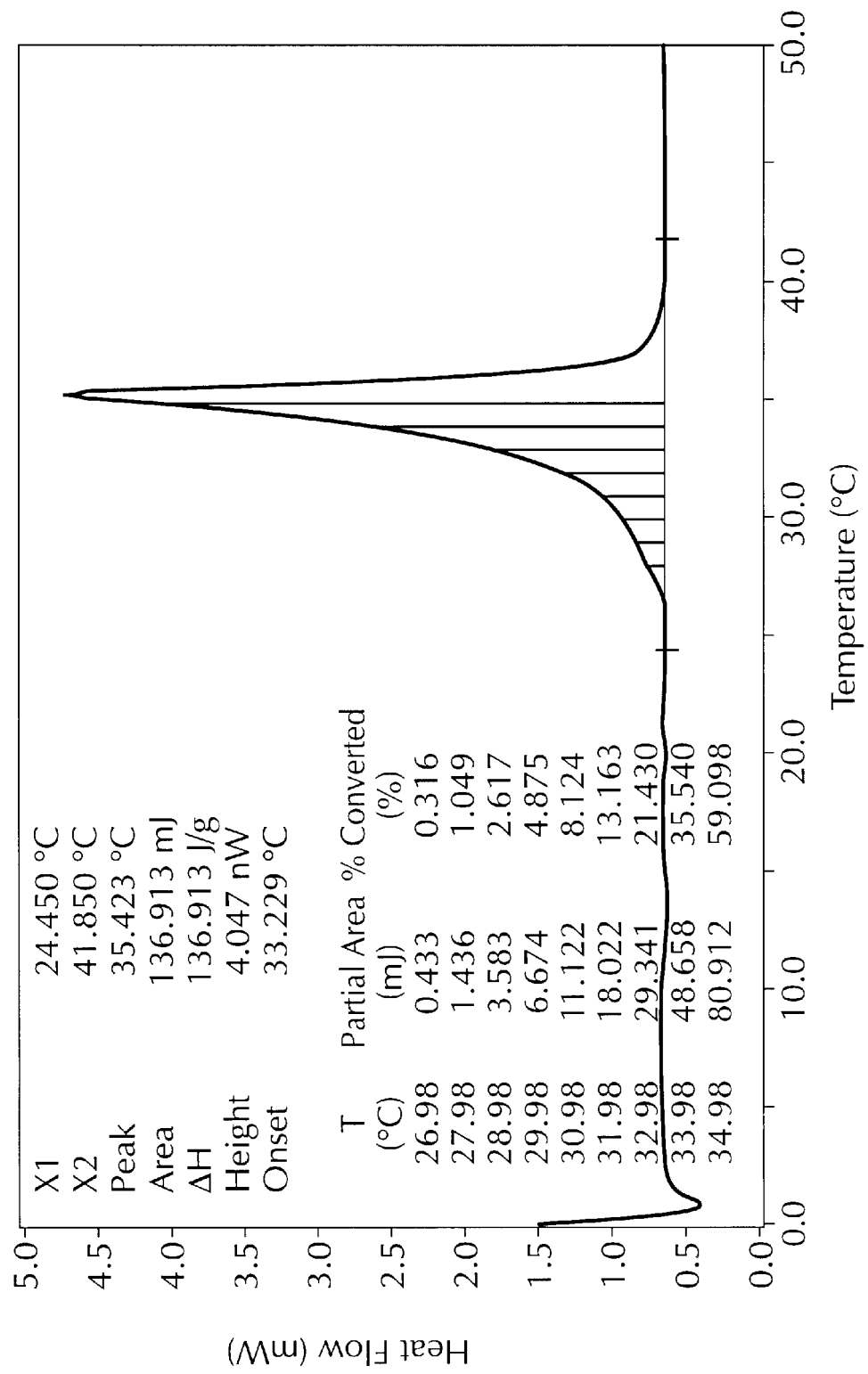
FIG. 9 is a DSC melting profile of a cocoa butter seeding agent.

The term "seed melting temperature" refers to the peak temperature of the dominant melting peak for the seed material as determined according to recognized analytical techniques using Differential Scanning Calorimetry (DSC) using a scanning rate of 5° C./min. The dominant melting peak of the DSC thermogram is that portion of the overall melt profile which represents the melting of substantially all of the sample. FIG. 9 shows a DSC scan for a seeding agent made from cocoa butter.

5. Set Chocolate Product

The term "set chocolate product" refers to a product in which sufficient fat has solidified at a given temperature to provide the product with a minimum degree of physical integrity, such that its shape and appearance are maintained at the given temperature.

6. Fats

The term "fats", as used herein, refers to triglycerides, diglycerides and monoglycerides that can normally be used in chocolates and chocolate-like products. Fats include the naturally occurring fats and oils such as cocoa butter, pressed cocoa butter, expeller cocoa butter, solvent extracted cocoa butter, refined cocoa butter, milkfat, anhydrous milkfat, fractionated milkfat, milkfat replacers, butterfat, fractionated butterfat, vegetable fats, modified vegetable fats and synthetically modified fats such as Caprenin.

7. Chocolate Setting Temperature

The term "chocolate setting temperature" refers to the temperature to which a chocolate composition must be cooled to produce a "set chocolate product".

8. Chocolate Melt Temperature

The term "chocolate melt temperature" refers to the temperature of a chocolate composition comprising a liquid fat phase. This temperature can range from the "chocolate setting temperature" up to any higher temperatures typically encountered in chocolate processing. Conversely, "chocolate melting temperature" would refer to the temperature at which point the fat phase is completely melted.

9. Chocolate Composition Comprising a Liquid Fat Phase

The term "chocolate composition comprising a liquid fat phase" refers to a chocolate or chocolate-like composition where the fat phase is liquid or partially liquid.

10. Force Sufficient to Cause Flow

The term "force sufficient to cause flow" refers to the force or more properly the stress which must be applied to a chocolate comprising a liquid fat phase to cause it to flow at a finite shear rate. The applied stress must be sufficient to overcome the yield stress of the chocolate. Such force may be applied during a number of different chocolate processing operations such as spraying, atomization, injection molding, pouring, enrobing, extrusion, shaping, spin molding, pumping, dripping, depositing, molding or combinations thereof.

11. Suspended Animation

The term "suspended animation" refers to the phenomena characteristic of the use of seeding agents as described herein, in which a chocolate comprising a liquid phase can be tempered through the addition of a seeding agent and be maintained for an extended period of time, after the addition of the seeding agent, without a significant change in viscosity and/or temper level, that is, there is insignificant detrimental crystallization after the addition of the seeding agent.

12. Continuous Fat Phase

The term "continuous fat phase" refers to the fat phase of a chocolate which represents the continuous phase into which are dispersed the non-fat particles, added seeding agent particles and any conventionally produced fat seed crystals, where the chocolate in a fluid state is representative of a solid in liquid dispersion.

13. Seed Addition Temperature

The term "seed addition temperature" refers to the temperature of a chocolate at which a seeding agent is added to a chocolate comprising a liquid fat phase.

14. Initial Seeding Viscosity

The term "initial seeding viscosity" refers to the apparent viscosity of a chocolate immediately after addition of a seeding agent at the seed addition temperature.

15. Viscosity

The term "viscosity" as used herein refers to the apparent viscosity of a chocolate as measured by conventional methods, particularly by the methods described below.

Chocolate displays non-Newtonian rheology and cannot be totally characterized by a single rheological measurement point. Despite this, apparent viscosity is a simple measure of viscosity useful for the evaluation of tempered and untempered chocolates and their suitability for operations such as enrobing and molding. The measurement of apparent viscosity can be accomplished by many methods. The method used herein for apparent viscosity measurements is as follows: The chocolate is maintained at the desired measurement temperature. The viscosity is measured using a Brookfield viscometer Model RV equipped with a "B" size T-spindle (approximately 36.4 mm cross-bar) and operating at 4 RPM. The spindle is immersed in the chocolate to be measured and allowed to rotate three times. The reading is taken after the third rotation and multiplied by 1000. The resultant value is the apparent viscosity in centipoise.

16. Enrobing Viscosity

The term "enrobing viscosity" refers to the apparent viscosity of a chocolate at the point that the chocolate is used to enrobe a confectionery center to produce a chocolate enrobed confectionery product. Similarly, related terms for the viscosity of a chocolate at the point of use in other processes such as spraying, atomization, injection molding, pouring, enrobing, extrusion, shaping, spin molding, pumping, dripping, depositing or molding, may be defined, for example, as the "forming viscosity".

17. Speckle Bloom

The term "speckle bloom" as used herein refers to a phenomena in which chocolate fat bloom appears as discrete spots or "speckles" on the surface of the chocolate after a thermal cycling bloom test as opposed to the more typical, continuous whitish or grayish appearance of fat bloom. The appearance of "speckle" bloom after a thermal cycling bloom test appears to be found predominantly with chocolates which have been tempered with some seeding agents.

18. Fat Bloom

The term "fat bloom" refers to the uncontrolled recrystallization of fat on the surface of a chocolate product characterized as a grayish coating on the surface of the chocolate.

19. Processing Temperature Range

The term "processing temperature range" refers to the temperature range between the chocolate solidification temperature and the seed melting temperature.

20. Seeded Chocolate

The term "seeded chocolate" refers to a chocolate comprising a liquid fat phase to which a seeding agent has been added.

21. Stable Fat Crystals

The term "stable fat crystals" refers to those crystalline forms or polymorphs that are stable at higher temperatures, that is these polymorphs have higher melting points. For cocoa butter, six crystal polymorphs have been recognized and characterized both by thermal analysis and X-ray diffraction and these six forms are well-known to those skilled in the art of chocolate manufacture (see Wille et al., "Polymorphism of Cocoa Butter", J. Am. Oil Chem. Soc., Vol. 43 (1966) pages 491–96). Referring to cocoa butter then, the term "stable fat crystals" is meant to include the form V and form VI polymorphs which melt at higher temperatures. The term "unstable fat crystals" refers to the remaining lower melting polymorphs.

22. Temper

The term "temper" refers to the presence of stable fat crystals in a chocolate. The degree or level of temper in a chocolate can be measured by commercially available instruments which characterize the behavior of a chocolate sample during controlled cooling. An example of this type of instrument is the Tricor Tempermeter [Tricor Instruments, Elgin, Ill.] which in its standard embodiment, determines chocolate temper during a 5 minute controlled cooling test. Specifically, the Tricor Tempermeter detects and measures an inflection point in a temperature versus time curve or trace. The units of temper, using the Tricor Tempermeter, may be expressed as chocolate temper units (CTU) and/or as a slope measurement. CTU measurements can be expressed in either Fahrenheit or Celsius temperature scale terms. All CTU measurements referred to herein are in the Fahrenheit scale, unless otherwise specified. Fahrenheit CTU measurements can be converted to Celsius scale by dividing by a factor of 1.8. Higher CTU values and lower slope values correspond with higher levels of temper. If there is no detectable inflection in the 5 minute trace, the chocolate would typically be assessed as having no temper.

23. Low Temper

The term "low temper" refers to temper which cannot be detected (i.e., no inflection) with a Tricor Tempermeter during a 5 minute trace, but which can be measured with a Tricor Tempermeter which has been modified to perform a 9.5 minute trace. The units of measurement are the same as those used for the measurement of "temper". If there is no detectable inflection in the 9.5 minute trace, i.e., the longest test time currently available with a Tricor unit, the chocolate would by necessity be assessed as having no temper, whereas it is believed that there is no commercially available instrument with a lower limit of detection.

Chocolate temper levels may be measured with a Tricor Tempermeter which characterizes the thermal properties of a chocolate subjected to a controlled cooling regime. This technique measures an inflection point in the cooling curve or trace and uses this data to produce a value for the temper level of a chocolate, expressed in Chocolate Temper Units (CTU) and as a slope value for the inflection. Higher CTU values and lower slope values correspond to higher levels of chocolate temper.

The Tricor Tempermeter is typically run using a 5 minute test period to produce the cooling trace for the temper determination. If a chocolate does not show an inflection during determination. If a chocolate does not show an inflection during the 5 minute run, it would typically be described as having no temper. However, with a modification of the tempermeter to extend the cooling period to 9.5 minutes, it is possible to detect temper (i.e., an inflection point) in some samples which did not register any temper in the 5 minute trace. Temper detectable in a 9.5 minute trace, but not in a 5 minute trace is defined as "low temper". If a chocolate does not show an inflection point during a 9.5 minute trace it would then be described as having no temper, however, it is still possible for such chocolates to have temper.

To measure temper levels below this limit, a method was developed using a rotational rheometer, in this case a Carri-Med Controlled Stress Rheometer Model CSL 500. By performing controlled cooling and shearing tests it is possible to compare the onset temperature of crystallization for chocolate with no inflection in a 9.5 minute trace to the onset temperature for the same chocolate which has been heated prior to analysis to ensure a true no temper condition. This difference in onset temperature is defined as a Rheological Temper Unit (RTU). The range of temper between truly no temper chocolate and the lowest level measurable in a 9.5 minute trace with a Tricor Tempermeter is defined as ultra-low temper. A more detailed description of the technique is given below.

24. Ultra-low Temper

The term "ultra-low temper" refers to temper which cannot be detected (i.e., no inflection) with a Tricor Tempermeter during a 9.5 minute trace, but which can be measured using a more sensitive Theological measuring technique as discussed further below. Ultra-low temper is expressed in rheological temper units (RTU).

Figure 2:
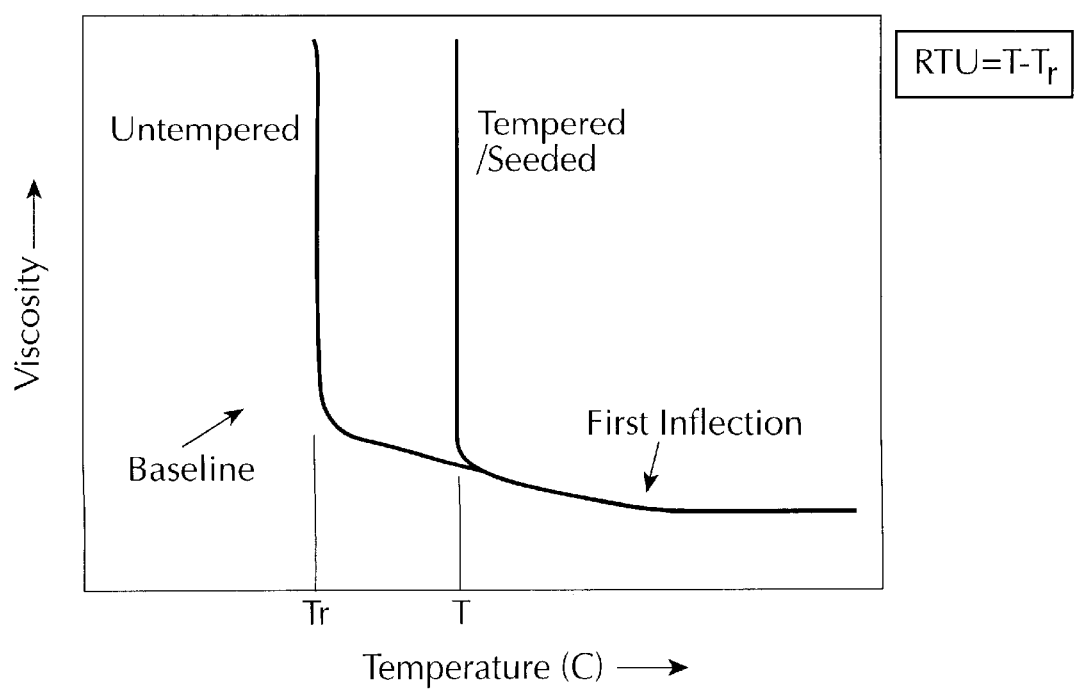
FIG. 2 is a graphical representation of a viscosity-temperature profile illustrating a method for determining temper levels expressed as rheological temper units (RTU) wherein the vertical axis represents viscosity and the horizontal axis represents temperature.

A Carri-Med Controlled Stress Rheometer is employed to determine ultra-low temper levels using a 4 cm–2 degree cone and plate configuration. The chocolate sample is loaded onto the rheometer plate at the temperature of the ultra-low temper chocolate sample, for example at 28° C. The sample is then cooled from 28° C. to 14° C. at a rate of $-1°$ C./min while being sheared at a rate of 5 sec$^{-1}$. A viscosity versus temperature curve is recorded until the viscosity begins to increase exponentially. Next, a similar test is run using the same chocolate sample which has been detempered by heating to 55° C. for 30 minutes prior to analysis. The onset temperatures for the exponential increases in viscosity are then determined by extrapolating the baseline and exponential portions of the curves to the point of intersection. The onset temperature for the ultra-low tempered sample is shown as T in FIG. 2. The onset temperature for the detempered unstirred chocolate sample is defined as the reference temperature and is shown as Tr in FIG. 2. From this data, a Rheological Temper Unit, or RTU is defined as the difference between the sample onset and the reference onset temperatures.

$$RTU = T - Tr$$

For chocolate samples tempered with seeding agents, the chocolate sample should be loaded onto the rheometer at the seed addition temperature. The temperature should then be lowered quickly to 28° C. to start the cooling test. For example, the lowering of the temperature should be carried out within about 20 seconds.

DESCRIPTION OF THE PREFERRED EMBODIMENTS

Figure 3:
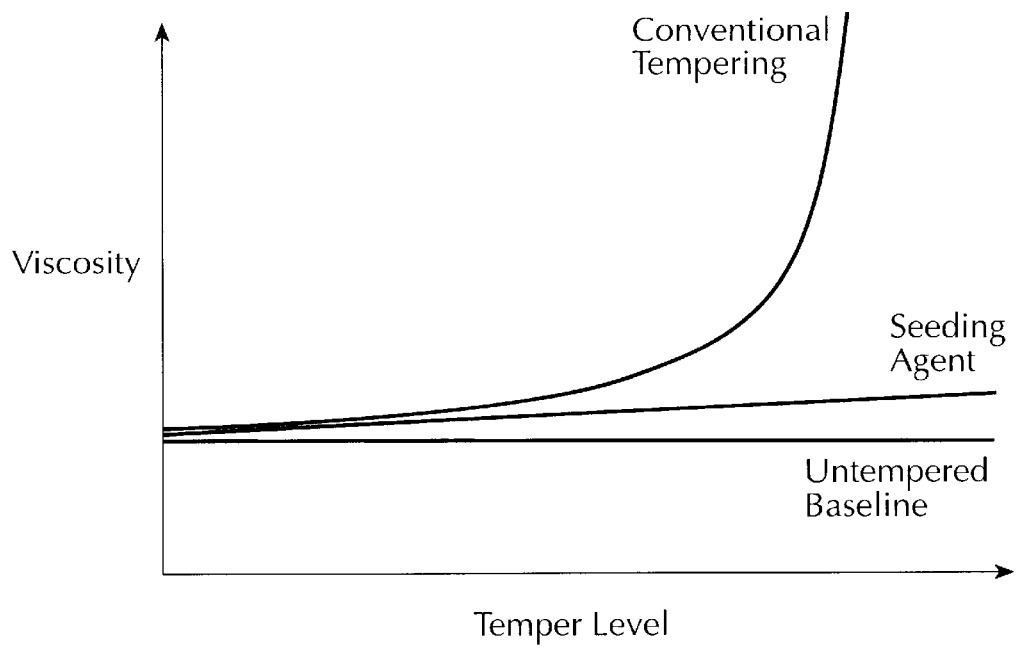
FIG. 3 is a graphical representation of the relationship between viscosity and temper level for a conventional tempering method and a method using seeding agents according to the invention, wherein the vertical axis represents viscosity and the horizontal axis represents temper level.

The present invention generally relates to methods of processing chocolate compositions without the detrimental increases in viscosity typically associated with the conventional tempering of chocolate. Using the present invention, chocolate compositions having reduced viscosities may be used in processes such as enrobing, molding, extrusion, spraying, aeration, depositing, etc. The chocolate seeded with the seeding agents according to the invention have dramatically reduced viscosities compared with conventionally tempered chocolate and are only slightly higher than that of untempered chocolate at the same temperature. FIG. 3 illustrates the change in viscosity with temper level with increasing time of conventional tempering and the use of seeding agents according to the invention.

Figure 4A:
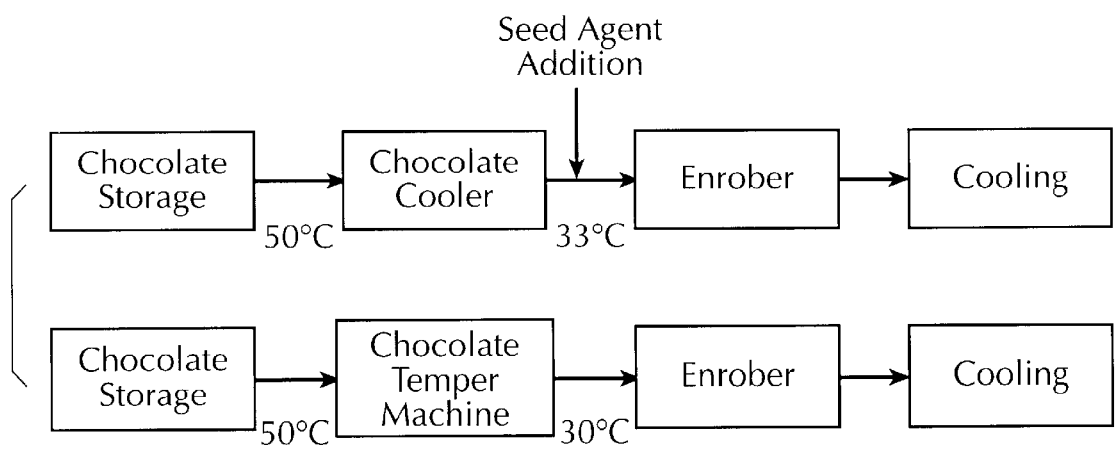
FIG. 4(a) illustrates a flow diagram of the steps in a conventional chocolate enrobing process and in a chocolate enrobing process according to one embodiment of the present invention.

Conventional tempering is based upon a protocol of thermal cycling which results in the development of stable Form V cocoa butter seed crystals. Typically, some 3 to 8% of the cocoa butter is present as crystalline seed in a properly tempered chocolate (See, *Chocolate, Cocoa and Confectionery*, 3rd Ed., by Minifie, B. W. (1989), page 195). At the fat levels encountered in typical SOI chocolate processing, the development of several percent solid cocoa butter seed, i.e., through tempering, can result in a 2 to 3 fold increase in viscosity and reduction in the "wetting" characteristics of the chocolate. However, if a lower fat chocolate is to be produced, the already high base viscosity increases to critical levels at which "normal" chocolate enrobing and molding becomes very difficult if not impossible. FIG. 4 is a graphical representation of the viscosity increases that occur during a conventional enrobing process and an enrobing process according to the invention. As can be seen in FIG. 4, the viscosity increases that occur during conventional tempering reach the highest levels prior to setting, during the enrobing step, where rheology control is critical. In contrast, the use of the seeding agent according to the invention provides reduced viscosities during the enrobing step.

Using the present invention, it is also possible to reduce the level of fat, yet maintain a viscosity comparable to that of a conventionally tempered chocolate having a higher fat content. Moreover, since the seeded chocolates have lower viscosities, for example, during enrobing, lower fat products can be produced because of the ability to produce thinner coatings on edible centers.

Accordingly, one embodiment of the invention relates to adding the seeding crystals to the chocolate mixture above the solidification temperature of the mixture. This allows for the postponement of the crystallization of the fat phase that occurs during conventional tempering. The temperature of the chocolate is not dropped below the normal crystallization/solidification temperature of the chocolate composition for a period of time sufficient to cause crystallization. Therefore, the chocolate does not begin to crystallize upon the addition of the seed crystals. Instead, the mixture is kept in what may be called "suspended animation" with the added seed crystals dispersed throughout the liquid fat phase. According to the invention, up until the point in the process when the seed crystals are added, the composition contains a liquid fat matrix and solid particles, i.e., cocoa powder, sugar particles and milk powders. Since the temperature of the composition remains above the solidification temperature, the composition does not "want" to temper, i.e., does not begin to crystallize. Since the chocolate does not crystallize, the normal increases in viscosity typically associated with conventional tempering are avoided and the only increase in viscosity is that caused by the addition of the solid particulate seeding agents to the chocolate suspension. As the amounts of seeding agents used according to the invention are small, the viscosity increase is minor. The liquid phase does not solidify and therefore does not result in a decrease in the liquid phase and an increase in solid phase which would otherwise greatly increase the viscosity of the system. As a result, the chocolate can be further processed without an increase in viscosity. After the further processing, i.e., enrobing, molding, etc., the tempered chocolate is then cooled in a cooling apparatus (e.g., a cooling tunnel) as in conventional chocolate processing to produce a set chocolate product.

Therefore, one advantage of using a seeding agent according to the invention is the ability to form a tempered chocolate without a substantial increase in viscosity compared to the base viscosity of the untempered melted state. This elimination of the typical increase in tempered chocolate viscosity ("the substantial viscosity increase" typically encountered during conventional tempering) enables the reduction of the total fat content to levels that have a viscosity comparable to conventionally tempered "normal" fat content chocolate. By comparison, the viscosity increase that results from conventional chocolate tempering limits these processes to higher fat levels and/or requires the use of formulations having significantly lower viscosities in the melted state before any tempering occurs. In conventional tempering, if a lower fat chocolate is to be produced, the already high initial base viscosity may increase to a point beyond critical levels at which "normal" chocolate enrobing and molding are no longer feasible.

According to the present invention, chocolates suitable for enrobing, for example, may be produced at fat levels as low as 21 or 22% since the normal increase in viscosity associated with conventional tempering is eliminated by use of the crystalline seeding agent. It is believed even lower fat content chocolates can be used by using ultra-low temper levels via seeding agents in combination with rapid cooling as set forth in related U.S. Application Ser. No. 08/782,902 entitled "Methods of Processing Chocolate and Products Produced by Same" by Neil A. Willcocks, Frank W. Earis, Ralph D. Lee, Thomas M. Collins, Wallace R. Palmer and William Harding, filed concurrently herewith and hereby incorporated by reference. The seeding agent reduces tempered chocolate viscosity by almost completely eliminating the increase in viscosity associated with conventional tempering. The use of seeding agent according to the invention provides a virtually constant viscosity profile across a wide range of chocolate fat percentages, temperatures and temper levels.

Figure 5:
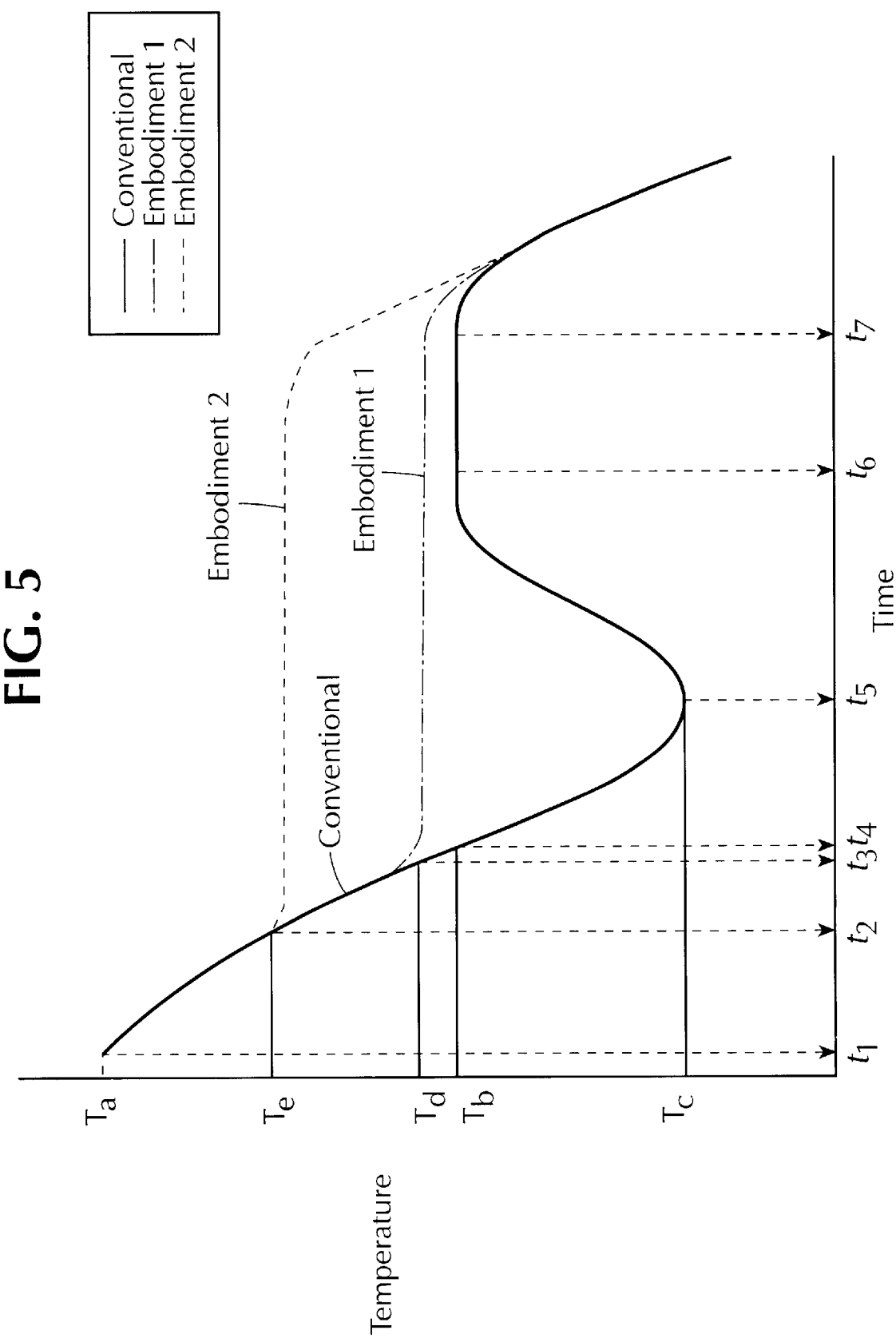
FIG. 5 is a graphical representation of a temperature time profile of a conventional chocolate process and two embodiments of the invention wherein the vertical axis represents temperature and the horizontal axis represents time.

FIG. 5 illustrates a conventional tempering sequence and two embodiments of the invention using seeding agents wherein the vertical axis represents temperature and the horizontal axis represents time. Referring to the plot of the conventional method, at time $t_1$ the chocolate is in a fully melted state having a bulk temperature of $T_a$ (about 50° C.) wherein the fat phase is essentially 100% liquid. The chocolate composition is then cooled below a temperature $T_b$ (about 31° C.) at time $t_4$ to reach a temperature $T_c$ (about 27° C.) at time $t_5$ to form unstable and stable crystals. The composition is then warmed to a temperature $T_b$ (about 31° C.) at time $t_6$ to melt out the unstable crystals that may have formed. At this point the chocolate composition has temper and is considered tempered chocolate. During conventional tempering, the crystallization of the fat phase gradually continues until the chocolate composition is finally cooled at time $t_7$ to a lower temperature to set the chocolate.

The temperature-time plot of a conventional tempering method can be compared with the temperature-time plots of seeding methods according to two embodiments of the invention.

Referring to the first embodiment (embodiment 1) shown in FIG. 5, the plot illustrates the temperature-time profile using substantially pure cocoa butter for the seeding agent. At time $t_1$, the chocolate composition is in a fully melted state having a bulk temperature of $T_a$ (about 50° C.). The chocolate composition is then cooled to a temperature $T_d$ (about 33° C.) at time $t_3$ (the seed addition temperature) and the seeding agents are added to form a seeded composition. The seeded composition is maintained at temperature $T_d$ until the chocolate is set by cooling at time $t_7$. The viscosity of the seeded composition increases slightly at time $t_3$ due to the addition of the solid seeding agent. However, the viscosity is maintained at substantially the same level throughout the subsequent processing, i.e., from $t_3$ to $t_7$.

The second embodiment (embodiment 2) shown in FIG. 5 relates to the use of higher melting point seeding agent such as SOS or BOB to allow for the processing of the seeded composition at elevated temperatures. The composition is cooled from $T_a$ to the seed additional temperature $T_e$ (about 42° C.) and the seeding agents are added at time $t_2$ to form a seeded composition. The seeded composition is maintained at $T_e$ until final cooling at $t_7$.

Figure 6:
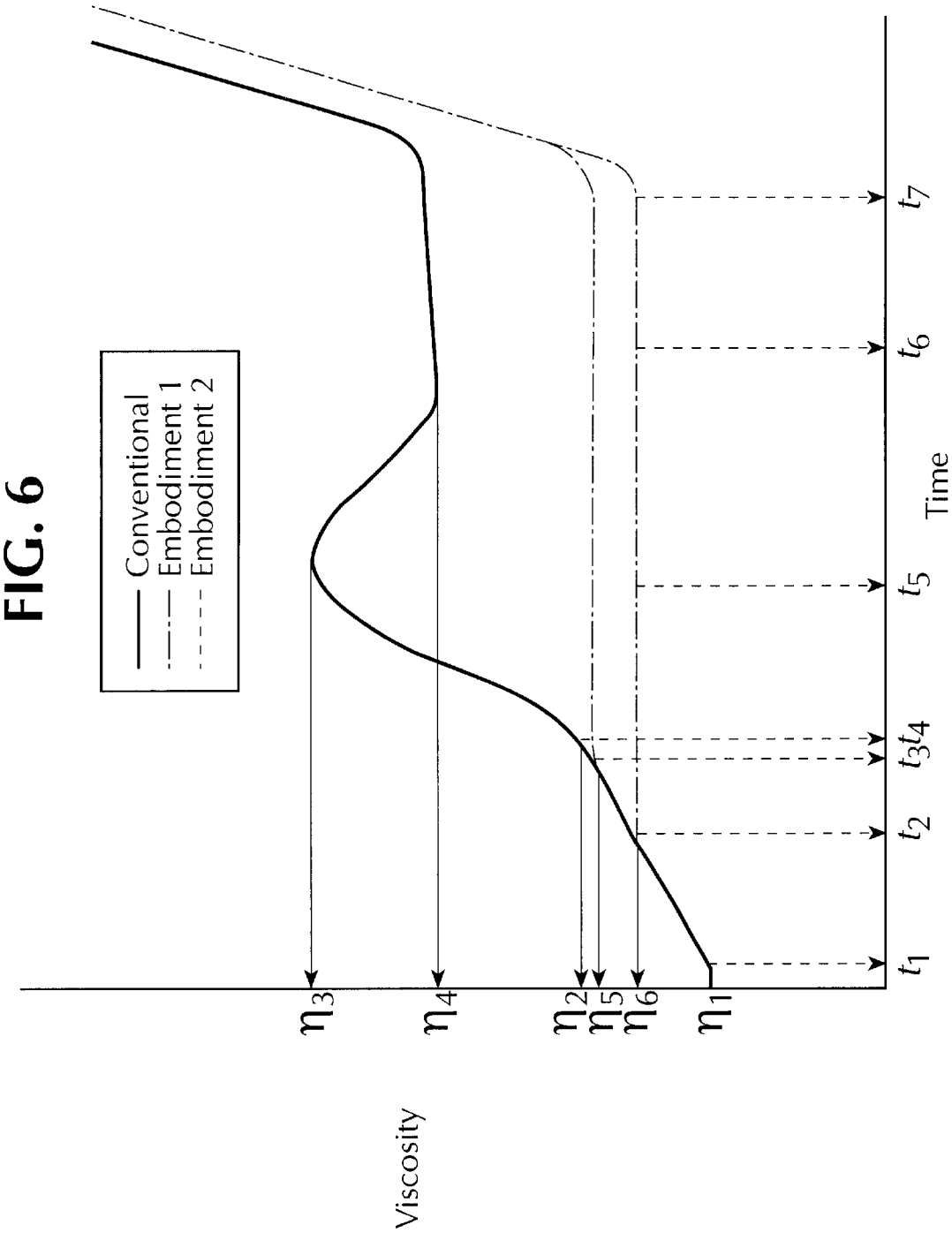
FIG. 6 is a graphical representation of a viscosity-time profile of an embodiment of a conventional chocolate process and of a chocolate process according to two embodiments of the invention wherein the vertical axis represents viscosity and the horizontal axis represents time.

FIG. 6 is a graphical representation of the relationship between viscosity and time for the conventional tempering method and the two embodiments using seeding agents according to the invention shown in FIG. 5. As can be seen in FIG. 6, the use of the seeding agents according to the invention provide seeded compositions having much lower viscosities during processing.

Referring to the plot representing the conventional method, the plot shows a gradual increase in viscosity from $t_1$ to $t_4$ as the untempered composition is cooled. At $t_4$, the viscosity increases at a greater rate as the liquid fat phase begins to crystallize. At $t_5$, the viscosity decreases as the composition is warmed to melt out the unstable crystals. This reduces the viscosity mainly because of a decrease in solids load due to the melting of the unstable crystals, although some of the decrease is attributable to the warmer temperature. The viscosity then begins to increase gradually as the composition continues to crystallize. The composition is finally cooled at $t_7$ to set the chocolate composition resulting in a sharp increase in viscosity as the chocolate sets.

Comparing the viscosity-time plot of the conventional methods with the plots for the two embodiments of the invention shown in the FIG. 6, it can be seen that the present methods provide much lower viscosities during tempering.

Referring to the plot for the first embodiment, as the unseeded composition is cooled from the melting temperature, the viscosity gradually increases until the seed addition temperature is reached and the seeding agents are added at $t_3$ when there is an increase in viscosity attributed to the addition of the solid seeding agents. However, the viscosity is maintained at the same level between times $t_3$ and $t_7$ when the seeded composition is set by cooling. Between $t_3$ and $t_7$ the seeded composition can be used in such applications as enrobing, injection molding, etc., without the detrimental increases in viscosity shown in the plot for the conventional method.

Embodiment 2 shows the same advantages as Embodiment 1 relating to maintaining viscosity after seed addition to avoid the detrimental increases in viscosity of the conventional tempering method. However, Embodiment 2 also shows the advantage of adding the seeding agent at time $t_2$ at a higher temperature resulting in an even lower viscosity due to the use of the elevated temperature. Accordingly, the viscosity-time plot from the second embodiment shows a reduction in viscosity not only because the increases due to crystallization of the fat phase are avoided, but also because the seeded chocolate suspension is maintained at higher temperatures which also reduces the viscosity. Between $t_2$ and $t_7$ the seeded composition can be used in such applications as enrobing, injection molding, etc., without the detrimental increases in viscosity shown in the plot for the conventional method.

Figure 7A:
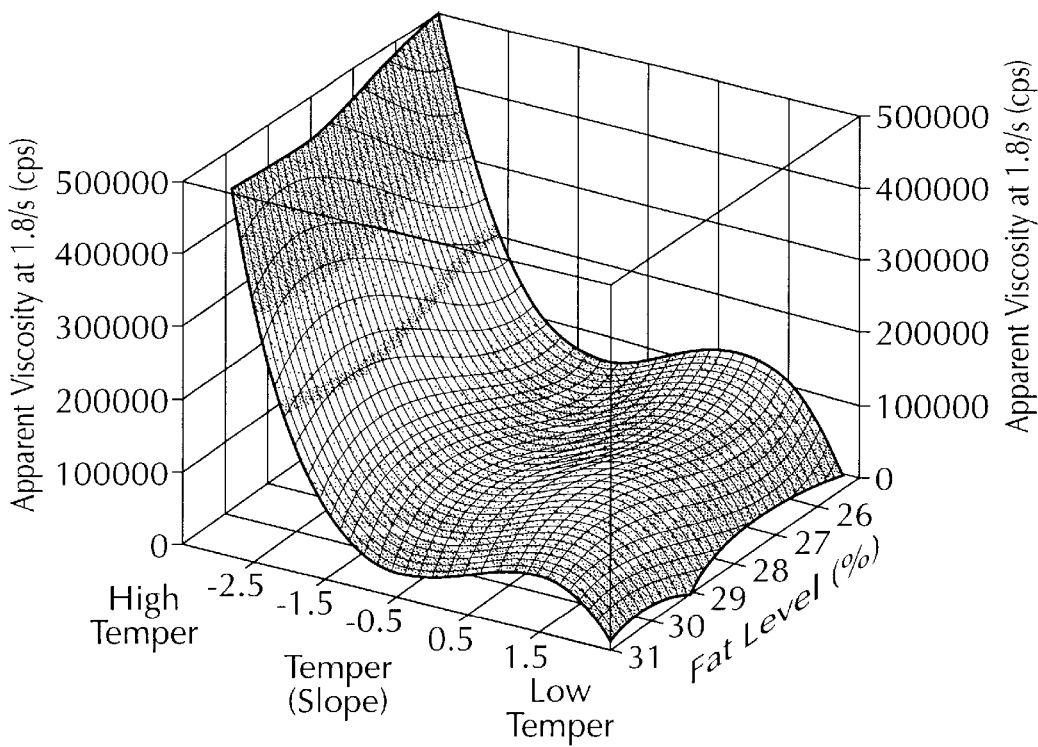
FIG. 7(a) is a three-dimensional graphical representation of apparent viscosity versus temper level (slope) and chocolate fat content (wt %) for a milk chocolate tempered by a representative conventional method.
Figure 7B:
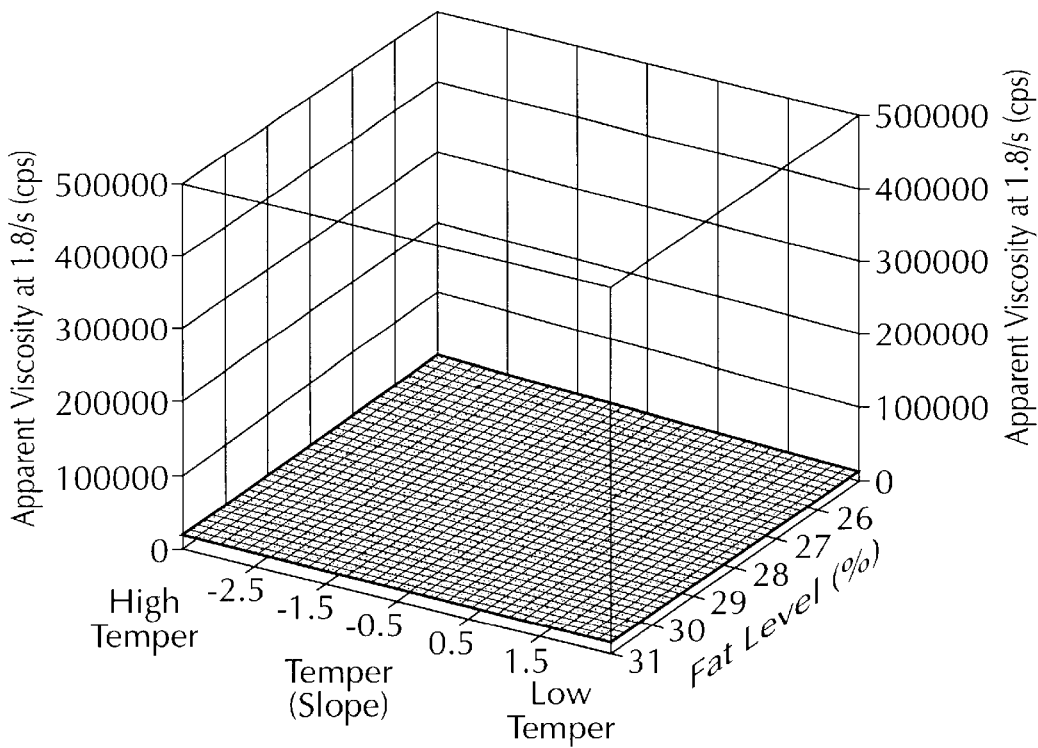
FIG. 7(b) is a similar representation for the same milk chocolate tempered according to one embodiment of the invention.

FIGS. 7(a) and 7(b) are further graphical representations comparing the viscosity effects of conventional tempering and the viscosity effects of using a cocoa butter seeding agent according to one embodiment of the invention. The regression coefficients for the response surface plots are also included in these figures. (The curves are based on regression analysis for 16 data points).

FIG. 7(a) shows the apparent viscosity plotted as a function of fat content and a temper level for a conventionally tempered chocolate. The viscosity data is reported as apparent viscosity at $1.8\ s^{-1}$ at the chocolate temper temperature of 28° C. (From a flow curve for the chocolate samples). FIG. 7(a) clearly demonstrates that as the temper level is increased and the total fat content decreased, the viscosity increases several fold.

In contrast, FIG. 7(b) shows the same viscosity/temper level/fat content relationship for a chocolate made according to one embodiment of the invention using a cocoa butter seeding agent to produce stable tempered chocolate at a temperature of 33° C. with the addition of only 0.5 wt % to 1.5 wt % solids. The difference in the chocolate apparent viscosity comparing conventional tempering (FIG. 7(a)) and tempering via addition of cocoa butter seeding agents (FIG. 7(b)) was dramatic and demonstrates that the use of the seeding agent according to the invention allows for the production of a chocolate with significantly lower fat contents. It is also apparent that tempered chocolate viscosity with seeding agents made according to the invention is very stable over a significant range of temper and fat content.

Figure 8A:
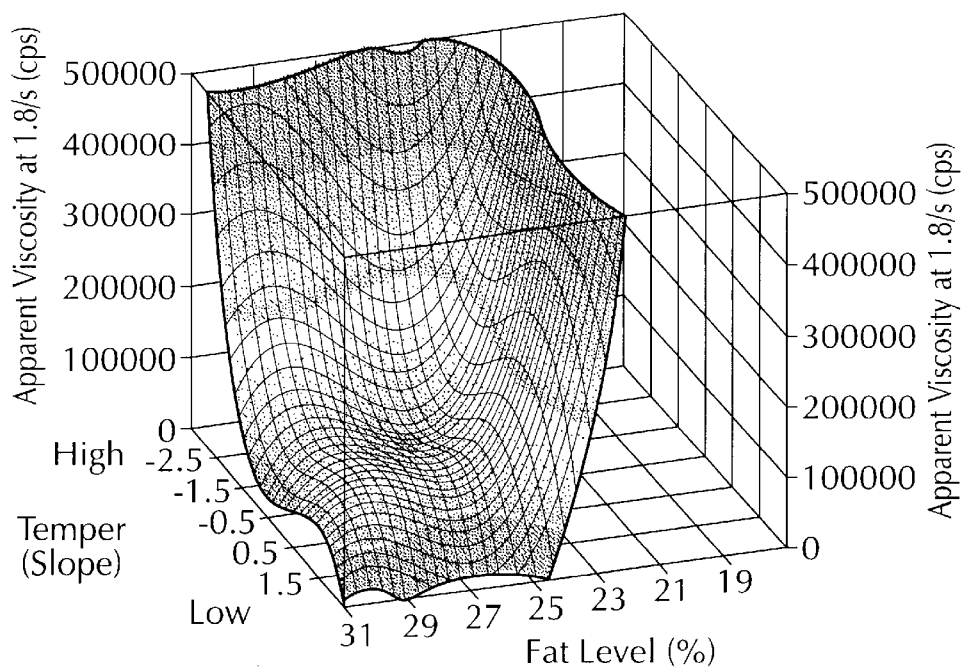
FIG. 8(a) is a three-dimensional graphical representation of apparent viscosity versus temper level (slope) and chocolate fat content (wt %) for a milk chocolate tempered by a conventional method extrapolated to lower fat contents.
Figure 8B:
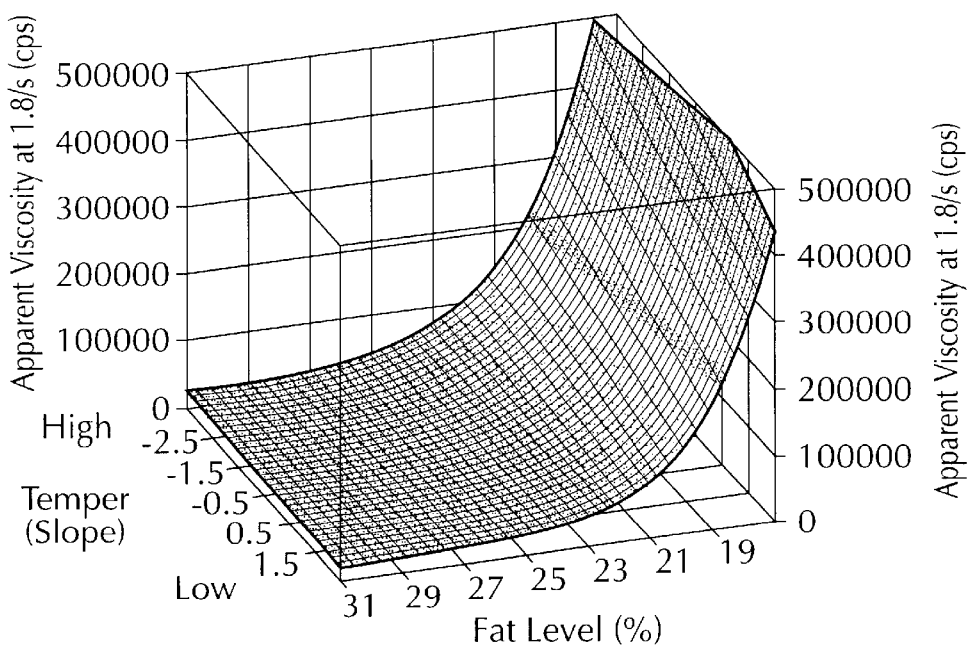
FIG. 8(b) is a similar representation for one embodiment of the invention.

The curves shown in FIGS. 7(a) and 7(b) were then extrapolated to lower fat levels and this data is shown in FIGS. 8(a) and 8(b) for the conventionally tempered chocolate and the chocolate tempered using seeding agents according to the invention. The curves in FIG. 8(a) further demonstrate that conventional tempering will be difficult at fat levels below 24 wt %. In contrast, FIG. 8(b) shows that fat levels as low as 21 to 22% and lower can be used while maintaining acceptable viscosity levels.

The use of the seeding agents according to the present invention is different from the use of seeding crystals as "tempering accelerators". Tempering accelerators are added during the setting step or sometimes referred to as the "solidification step" either shortly before or shortly after the temperature of the chocolate mixture is brought below the solidification temperature of the liquid fat phase and initiates the crystallization of the liquid fat phase.

Conversely, the seeding crystals according to the present invention are added to the chocolate mixture above the solidification temperature (or below and subsequently warmed to above the solidification temperature) to enable the postponement of crystallization of the fat phase until final cooling. The temperature of the chocolate is not dropped below the normal crystallization/solidification temperature of the composition until the chocolate is ready to be set. This allows the seeded chocolate to be further processed prior to setting without increases in viscosity.

Accordingly, one preferred embodiment of the invention relates to further processing the seeded chocolate composition while maintained within a processing temperature range that is above the solidification temperature and below the melting temperature of the seeding agent. That is, the seeded chocolate composition may be subjected to a force sufficient to cause flow. Such forces are applied to chocolate compositions during a variety of applications including enrobing, pouring, spin molding, pumping, extrusion, injection molding, spraying, atomization, shaping, dripping, depositing, aeration with air or other gases, molding or combinations thereof. For example, since the tempered chocolate is maintained at substantially the same viscosity prior to setting, the pumps required to transfer the tempered chocolate through a processing system require less energy.

According to one preferred embodiment of the invention, the increase in apparent viscosity of the seeded chocolate composition attributable to crystallization of the fat phase varies less than 20% prior to cooling to below the solidification temperature, advantageously less than 15%, even better less than 10% and most preferred less than 5%.

Preferably, the apparent viscosity of the seeded composition varies less than 20% and increases less than 10% from the initial seeding viscosity prior to cooling to below the solidification temperature. Advantageously, the apparent viscosity of the seeded composition varies less than 15% and increases less than 5% prior to cooling to below the solidification temperature. Even better, the apparent viscosity of the seeded composition varies less than 10% and increases less than 3% prior to cooling to below the solidification temperature. Most preferred, the apparent viscosity of the seeded composition varies less than 5% and increases less than 2% prior to cooling to below the solidification temperature.

According to one preferred embodiment of the invention, the seeded chocolate composition is further processed onto an edible product prior to the cooling, i.e., enrobed onto a center. The chocolate has an initial seeding viscosity immediately after adding the seeding agents and a processing viscosity, i.e., enrobing viscosity, during the additional processing step. Preferably, the ratio of initial seeding viscosity to the processing viscosity is greater than 0.80 and less than 1.2. That is, the viscosity of the seeded chocolate composition does not change significantly between the time of seeding and the time of setting. More preferably, the ratio is greater than 0.85, advantageously greater than 0.90, even better greater than 0.95 and most preferred between 0.99 and 1.01.

Since the increase in viscosity typically associated with tempering is avoided by using the invention, untempered chocolate formulations having higher initial viscosities can be used without the substantial viscosity increase from tempering. Any increase in viscosity with seeding agents is minor and is limited to that caused by the small amount of seeding agents added to the formulations.

As a result, lower fat formulations can be used. Preferably, the chocolates made using the present invention have fat levels less than less than 32 wt % fat, advantageously less than 30 wt % fat, even better less than 28 wt % fat, most preferred less than 26 wt %. Even lower fat formulations may be used such as below 25 wt %, 24.5 wt %, 24 wt %, 23%, 22 wt %, 21 wt % and 19 wt. %.

Accordingly, another aspect of the invention relates to the advantages associated with being able to work the tempered chocolate more easily since the viscosity does not increase significantly. Accordingly, another preferred embodiment relates to a method further comprising the step of enrobing the seeded chocolate composition onto an edible product prior to the step of cooling the seeded chocolate composition to form an enrobed product having a set chocolate coating.

Yet another aspect of the invention relates processing tempered chocolates at even higher temperatures using seeding agents having higher melting points. According to one embodiment of the invention, a chocolate composition containing a liquid fat phase is seeded at a seed addition temperature above the solidification temperature of the fat phase. This provides a tempered chocolate usable or processible at elevated temperature allowing several advantages. One advantage of this aspect of the invention relates to the additional reductions in chocolate viscosity provided with the ability to process the tempered chocolate at higher temperatures. Since the viscosity of a fluid is reduced with increasing temperatures, the ability to process the tempered chocolate at elevated temperatures results in additional decreases in viscosities providing a tempered chocolate that is even easier to use in such processes as enrobing, injection molding, spin molding, etc.

Another advantage of this aspect of the invention is the ability to coat edible centers having higher surface temperatures. Since the tempered chocolate can be used at higher temperatures, the enrobed centers, for example, do not have to be cooled to temperatures near or below the solidification temperature of the fat phase. During conventional tempering, the centers are cooled so that the temper created within the chocolate does not melt out. Using higher melting point seeding agents at elevated temperatures allows the seeded composition to be enrobed onto a center having a higher temperature as long as the temperature of the center is not high enough to melt out the seeds prior to cooling. This provides even further processing efficiencies because of the ability to omit the step of cooling hot centers prior to enrobing. Moreover, chocolate will enrobe products more efficiently at higher temperatures due to better wetting characteristics providing even further advantages such as more uniform, thinner coatings.

Yet another advantage of using high temperatures is the ability to contact the tempered chocolates having higher temperatures with chilled forming devices to result in a formed chocolate product having good surface gloss. It is believed that the fat retractions caused by the chocolate contacting a chilled surface results in a dull product. "[I]f the solids cannot move together as the fat contracts, the surface fat will be withdrawn by the internal suction which is developed". *Confectionery Production*, "some thoughts on the Gloss of Chocolates" by J. Koch, pages 182–184 and 254 (May 1978).

The ability to contact chilled molds or forming or embossing devices with a tempered chocolate having a higher temperature enables the hot tempered chocolate to temporarily warm the contacted surface of the chilled mold thereby reducing or eliminating the fat retraction from the surface of the mold. Moreover, the hot chocolate wets the chilled surface of the mold better. The result is the ability to rapidly form molded products having good gloss. Methods of using the seeded compositions to form glossy molded product using chilled forming/embossing devices according to the present invention are set forth in more detail in U.S. application Ser. No. 09/341,429 entitled "Methods of Shaping or Embossing Chocolates with a Chilled Forming Device and Products Produced Using Same" by Neil A. Willcocks, William Harding, Ralph D. Lee, Thomas M. Collins, Frank W. Earis and Steven D. Stephens, filed concurrently, hereby incorporated by reference.

Preferably, the seed addition temperature is at least 1° C. greater than the solidification temperature of the fat phase of the chocolate composition, advantageously at least 2° C. greater than the solidification temperature, even better at least 3° C. greater than the solidification temperature and most preferred at least 4° C. greater. Depending on the seed melting temperature in relation to the solidification temperature, an even greater processing window can be provided using a seeding agent that has a melting temperature significantly higher than the liquid fat phase. For example, the use of BOB or SOS as seeding agents enables the use of seed addition temperatures at least 5° C. or at least 6° C. higher than the solidification temperature.

Preferably, the seeding agents have a seed melting temperature at least 1° C. higher than the seed addition temperature, advantageously at least 2° C. higher than the seed addition temperature, even better at least 3° C. higher than the seed addition temperature and most preferred at least 4° C. higher than the seed addition temperature.

If the seeding agent is of a substantially uniform composition and therefore has a sharper peak melting temperature, the seed addition temperature can be closer to the seed melting temperature since melting of the seed occurs at a specific temperature. Accordingly, one preferred embodiment uses a substantially pure seeding agent having a seed melting temperature at least 0.5° C. higher than the seed addition temperature, advantageously at least 0.75° C. higher.

FIG. 9 is a graphical representation of a DSC scan for a cocoa butter seeding agent found to have a melting point of 35.4° C., with a calculated melting onset of 33.2° C.

Another consideration to take into account is the solubility of the seeding agent in the fat system. If the solubility of the agent is too high, the seeding agent may dissolve. Accordingly, matching of the seeding agent material with a particular fat system may be necessary to maintain temper over extended periods of time.

Figure 10:
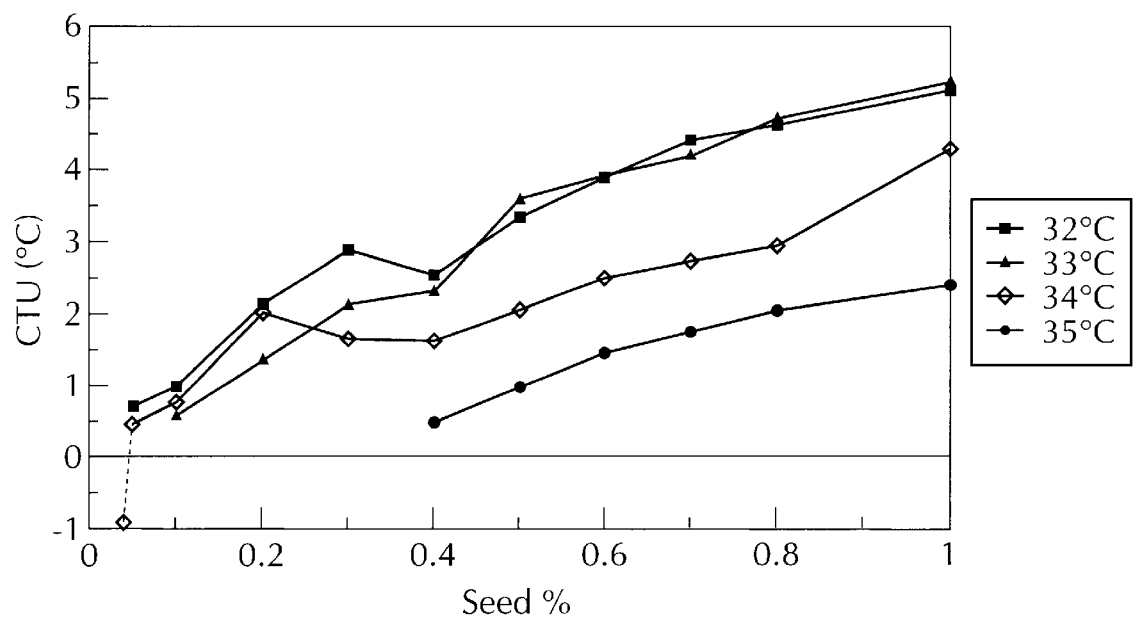
FIG. 10 is a graphical representation of the relationship between tempering and weight % seed at various temperatures wherein the vertical axis represents temper level (CTU) and the horizontal axis represent seed %.
Figure 11:
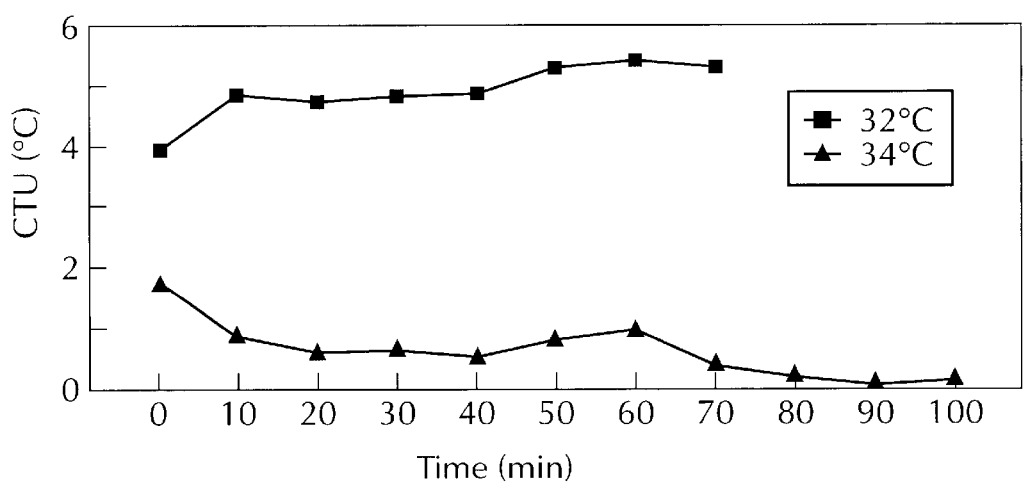
FIG. 11 is a graphical representation of the relationship between temper level (CTU) and time elapsed since 1 wt. % seeding agent addition at 32° C. and 34° C., wherein the vertical axis represents temper level and the horizontal axis represents time.

FIG. 10 is a graphical representation of the relationship between temper level, CTU(° C.), and weight percent cocoa butter seeding agent at various processing temperatures wherein the vertical axis represents temper level and the horizontal axis represents wt % seeding agent. FIG. 11 is a graphical representation of the relationship between temper level and time elapsed since 1% cocoa butter seeding agent addition at 32° C. and 34° C. As can be seen from the plots, the resulting temper level decreases as the temperature increases. This is believed to be due to the partial melting of the cocoa butter seeding agent.

Another aspect of the invention relates to the ability to formulate low fat chocolates while maintaining workable viscosities. As set forth above, one advantage of using the seeding agent is that it results in tempered chocolate without a substantial increase in viscosity compared to the base viscosity of the untempered melted chocolate. This control of the chocolate viscosity enables the reduction of the total fat content of a chocolate to lower levels while providing a viscosity comparable to conventionally tempered "normal" fat-content chocolate. In addition, the inventive process results in reduced chocolate build-up problems in enrobers or other apparatus since the conventional continual increase in viscosity during tempering is avoided and the enrober can be operated at higher temperatures, e.g., 34° C. The tempered chocolate made according to the present invention also has improved wetting characteristics and lower viscosities providing for thinner, more uniform coatings, enhanced spin molding performance and broader product design options. Another benefit of this process is that enrobed products can be made having very thin, uniform chocolate coatings.

Accordingly, one aspect of the invention relates to methods of processing a chocolate composition containing solid particles dispersed throughout a continuous fat phase having a solidification temperature comprising the steps of:

(a) adding seeding agents having a seed melting temperature to a chocolate composition comprising a liquid fat phase at a seed addition temperature thereby forming a seeded chocolate composition, wherein the seed addition temperature is above the solidification temperature;

(b) maintaining the seeded chocolate composition within a processing temperature range without detrimental crystallization of the liquid fat phase, the processing temperature range being between the solidification temperature and the seed melting temperature; and (c) cooling the seeded chocolate composition to a setting temperature below the solidification temperature to form a set chocolate product.

Another aspect of the invention relates to methods of processing a chocolate composition containing solid particles dispersed throughout a continuous fat phase having a solidification temperature comprising the steps of:

(a) adding seeding agents having a seed melting temperature to a chocolate composition comprising a liquid fat phase at a seed addition temperature thereby forming a seeded chocolate composition, wherein;

(b) maintaining the seeded chocolate composition within a processing temperature range without detrimental crystallization of the liquid fat phase for a period of time greater than 1 minute, the processing temperature range being between the solidification temperature and the seed melting temperature; and (c) cooling the seeded chocolate composition to a setting temperature below the solidification temperature to form a set chocolate product.

Yet another aspect of the invention relates to methods of processing a chocolate composition containing solid particles dispersed throughout a continuous fat phase having a solidification temperature comprising the steps of:

(a) adding seeding agents having a seed melting temperature to a chocolate composition having a liquid fat phase at a seed addition temperature thereby forming a seeded chocolate composition, wherein the seed addition temperature is at least 3° C. higher than the solidification temperature; and (b) cooling the seeded chocolate composition to a setting temperature below the solidification temperature to form a set chocolate product.

A still further aspect of the invention relates to methods of processing a chocolate composition containing solid particles dispersed throughout a continuous fat phase having a solidification temperature comprising the steps of:

(a) adding seeding agents having a seed melting temperature to a chocolate composition comprising a liquid fat phase at a seed addition temperature thereby forming a seeded chocolate composition, wherein the seed addition temperature is above the solidification temperature and wherein the seeding agents comprise cocoa butter in the form V polymorph, form VI polymorph or mixtures thereof; and (b) cooling the seeded chocolate composition to a setting temperature below the solidification temperature to form a set chocolate product.

The above-mentioned methods all relate to the addition of the seeding agents are added to a chocolate composition containing a liquid fat phase. Typically, this will involve heating a chocolate formulation to melt the fat phase and subsequently cooling the mixture and adding the seeding agent. Alternatively, the seeding agents may be added to the chocolate composition without cooling, i.e. added to chocolate in a storage state, or the seeding agent may be added to a chocolate composition which is then heated to a temperature which will not melt the seeding agents during the subsequent processing conditions.

For example, another embodiment of the invention relates to a method comprising the steps of:

(a) cooling a chocolate composition comprising a liquid fat phase having a solidification temperature from a chocolate melt temperature to a seed addition temperature, wherein the chocolate melt temperature is above the seed addition temperature and the seed addition temperature is above the solidification temperature;

(b) adding seeding agents having a seed melting temperature above the seed addition temperature to the chocolate composition at the seed addition temperature thereby forming a seeded chocolate composition, (c) maintaining the seeded chocolate composition within a processing temperature range without detrimental crystallization of the liquid fat phase, the processing temperature range being between the solidification temperature and the seed melting temperature; and (d) cooling the seeded chocolate composition to a setting temperature below the solidification temperature to form a set chocolate product.

The seed addition temperature may be above or below the seed melting temperature as long as that temperature does not result in the melting of the seeding agents to the extent that it no longer provides temper. It is an object of the invention to introduce the seeding agents into chocolate compositions to provide temper. If the seeding agents are melted, the temper may be reduced or eliminated. Accordingly, the seed addition temperature is preferably below the seed melting temperature.

However, the seed addition temperature could be higher then the seed melting temperature as long as the chocolate is processed quickly into a final form (i.e., quickly enrobed onto an edible center) and cooled quickly to arrest any detrimental melting of the seeding agent. In fact, one embodiment for practicing the invention involves reducing the size of seeding agent particles by either the use a high seed addition temperature or the addition of the seeds at a lower temperature and then heating the seeded composition. That is, exposing the seeding agents to elevated temperatures can be used to result in a controlled size reduction of the seed agents by melting.

Another preferred embodiment of the invention relates to the control of the process parameters including seed melting temperature, seed addition temperature and processing temperature range to result in a flowable tempered chocolate composition that does not exhibit the detrimental increases in apparent viscosity typically encountered when processing conventionally tempered chocolate. This aspect of the invention reduces or entirely prevents the crystallization of the liquid fat phase after adding the seeding agents. This can be referred as forming a tempered chocolate that is in a "suspended animation" with respect to the fat phase. The term "suspended animation" describes one advantageous characteristic of using seeding agents as described herein, in which a chocolate comprising a liquid phase can be tempered through the addition of a seeding agent and be maintained for an extended period of time, after seed addition, without a significant change in viscosity. That is, there is no detrimental crystallization after the addition of the seeding agent.

Accordingly, another preferred embodiment relates to methods further comprising the step of maintaining the seeded chocolate composition within a processing temperature range without detrimental crystallization of the liquid fat phase prior to cooling step. In order to reduce the amount of crystallization in the fat phase without melting the seeding agents, the processing temperature range should preferably be between the chocolate solidification temperature and the seed melting temperature. According to one embodiment, the seeded chocolate composition is maintained within the processing temperature range without detrimental crystallization of the liquid fat phase for a period of time greater than one second. Preferably, the seeded chocolate composition is maintained within the processing temperature range for a period of time greater than 10 seconds, advantageously greater than 30 seconds, even better greater than 1 minute and most preferred greater than 5 minutes. In fact, if the temperature of the seeded composition is maintained within the proper temperature range the chocolate can be held in "suspended animation" without detrimental increases in viscosity for extended periods of time. For example, the composition may be held in "suspended animation" for a period of time greater than 10 minutes, 0.5 hour, 1 hour, 2 hour, 4 hour, 6 hours or even longer if the temperature is controlled.

The seeding agents should be added in an amount sufficient to provide a temper level in the chocolate that will provide an acceptable finished product. Preferably, greater than 0.1 wt % is used, advantageously greater than 0.5 wt %. However, levels below these ranges can be used in embodiments using low or ultra temper levels.

The resultant set chocolate confectionery product preferably comprises a crystalline fat phase containing cocoa butter crystals selected from the group consisting of polymorphs V, VI and mixtures thereof. The seeding agents should be added in an amount less than 6 wt % to avoid increasing the viscosity of the chocolate too much. Preferably, the seeding agents are added in an amount less than 5 wt %, advantageously less than 4 wt %, even better less than 3 wt %, and most preferred less than 2 wt %.

The seeding agents used in the invention can be any material that provides temper in a chocolate composition. Suitable materials include (a) powders of stable crystals of a fat or oil composed of as a main component a 1,3-saturated-2-unsaturated triglyceride, the total carbon atoms of the constituent fatty acid residue of which are 50 to 56; (b) various forms of SOS (1,3-distearoyl-2-oleyl-glycerol; (c) various forms of BOB (1,3-dibehenoyl-2-oleoylglycerol); (d) various forms of SSS (1,2,3-tristearoyl glycerol); (e) seeding agents that comprise cocoa butter or cocoa butter extracts; and (f) other naturally occurring or synthetic triglycerides.

According to one embodiment of the invention, the seeding agent is comprised of cocoa butter. Preferably greater than 15 wt %, advantageously greater than 25 wt % weight, even better greater than 50 wt %, and most preferred greater than 75 wt % of cocoa butter. Yet another preferred embodiment relates to using even higher purity cocoa butter seeding agents, such as greater than 90 wt %, greater that 95 wt % and even greater that 99 wt %.

Figure 12:
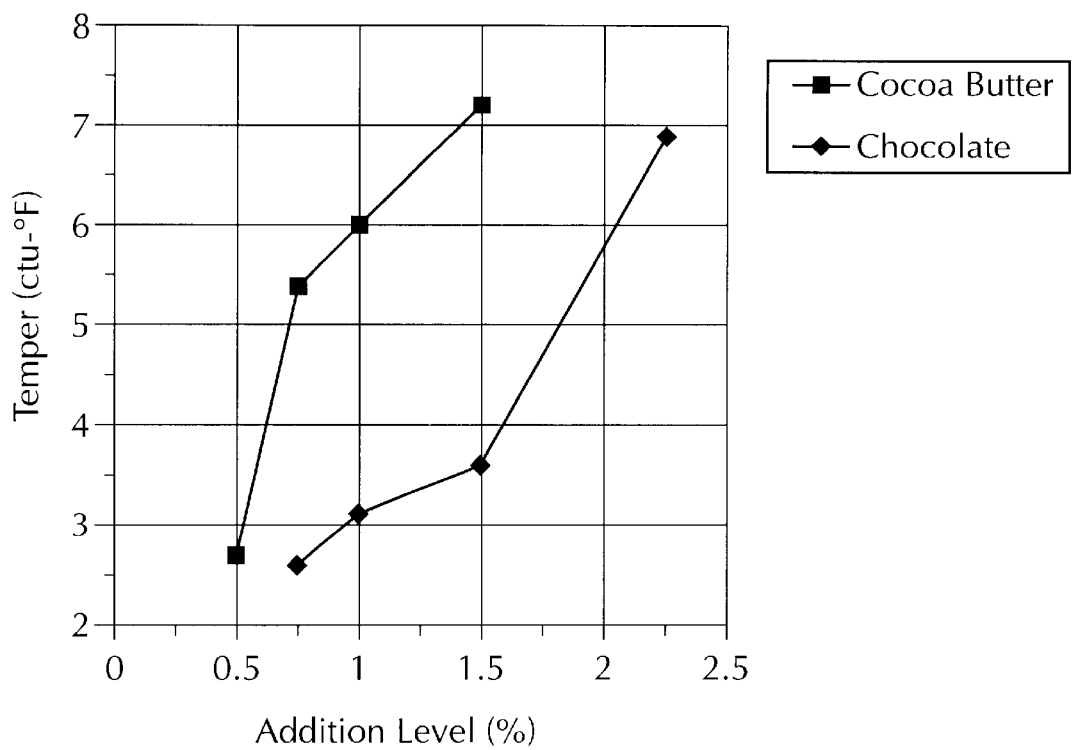
FIG. 12 is a graphical representation of a temper level-weight percent additive profile of a conventional chocolate process using dark chocolate shavings as a seeding agent compared with a chocolate process using cocoa butter seeding agents according to the invention wherein the vertical axis represents temper (ctu-° F.) and the horizontal axis represents weight percent additive.
Figure 13:
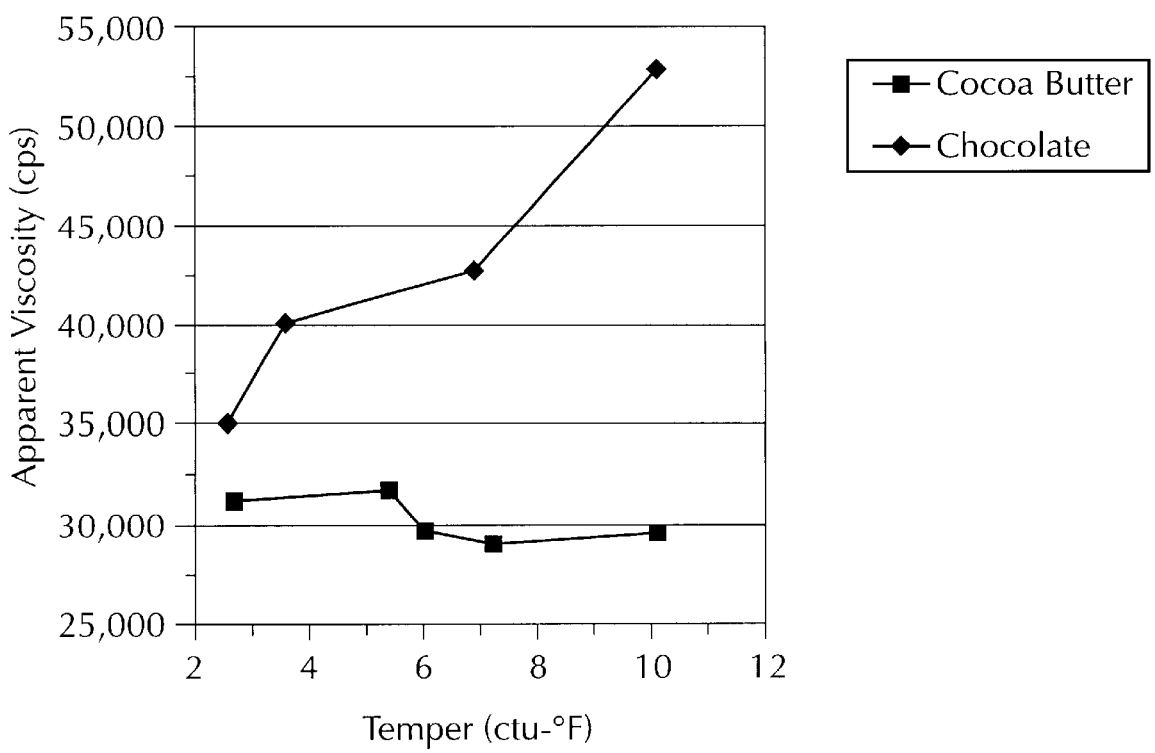
FIG. 13 is a graphical representation of an apparent viscosity-temper level profile of a conventional chocolate process using dark chocolate shavings as a seeding agent compared with a chocolate process using cocoa butter seeding agents according to the invention wherein the vertical axis represents apparent viscosity (cPs) and the horizontal axis represents temper level (CTU-° F.)

FIGS. 12 and 13 illustrate a comparison between the use of the cocoa butter seeding agents and chocolate shavings. FIG. 12 is a graphical representation of the relationship between temper (CTU-° F.) and weight % seeding agent whereas the vertical axis represents temper and the horizontal axis represents addition level. As can be seen by comparing the plot for the cocoa butter seeding agent with that of the chocolate shavings, the former is a significantly more effective seeding agent for providing temper at any given weight percent seed added. FIG. 13 is a graphical representation of apparent viscosity versus temper for cocoa butter seeding agents and chocolate shavings, and shows that the former increases the apparent viscosity of the suspension much less than the latter for any given temper level. Each of FIGS. 12 and 13 confirm that cocoa butter seeding agents are highly advantageous compared with the use of chocolate shavings.

The cocoa butter seeding agent should comprise the Form VI polymorph of cocoa butter. Preferably, the seeding agents comprise the Form VI polymorph of cocoa butter in an amount greater than about 20 wt %, advantageously greater than about 30 wt %, even better greater than about 40 wt %, and most preferred greater than 50 wt %. According to one particularly preferred embodiment, the seeding agent comprises substantially pure Form VI polymorph.

The seeding agents according to the invention are preferably in the form of particles having an average diameter less than 40 microns, advantageously less than 30 microns, even better less than 20 microns, and most preferred less than 15 microns.

According to another embodiment, the seeding agent particles may have an outer surface layer comprising cocoa butter to make the seeding agent to mimic the effects of pure cocoa butter with the liquid fat phase. The cocoa butter or other seeding material may, for example, be coated on the cocoa solids, sugar and/or milkfat used in the chocolate. For example, the outer surface layer comprises the Form VI polymorph of cocoa butter.

According to another embodiment, the seeding agents are added to the formulation in combination with other solid additives prior to the step of adding. The other solid additives may include cocoa solids, sugar, milkfat or mixtures thereof.

According to yet another embodiment, the seeding agents are dispersed in a slurry prior to adding to the chocolate composition. The slurry may comprise a lipid or hydrophilic carrier or mixtures thereof. The hydrophilic carrier may be selected from the group consisting of water, sugar syrup, chocolate liquor and mixtures thereof.

As stated above, since the temperature of the tempered chocolate can be maintained at elevated levels according to the invention, the tempered chocolate can be added to an enrobed center at elevated temperatures. This provides several advantages. The first advantage is that the hotter chocolate wets the enrobed centers more easily providing a more uniform, higher quality coating. Moreover, the centers do not have to be cooled to temperatures below the solidification temperature of the chocolate. During conventional chocolate tempering, the enrobed centers have to be cooled to avoid the melting out of the seed crystals. That is, if a conventionally tempered chocolate is enrobed onto a center having a surface temperature higher then the crystal nuclei formed during tempering, these nuclei will begin to melt. This will reduce the temper level of the chocolate, possibly below that necessary to form a stable set chocolate. The present invention includes the use of high melting temperature seeding agents at elevated processing temperatures. This allows the seeded chocolate formulations according to the invention to be enrobed onto an edible center having a surface temperature higher then the solidification temperature of the fat phase. Accordingly, one embodiment of the invention relates to methods of enrobing the seeded compositions onto edible centers wherein the edible center has a surface temperature at least about 1° C. higher then the solidification temperature during enrobing, preferably at least about 2° C. higher, advantageously at least about 3° C. higher, even better at least about 4° C. higher and most preferred greater than about 5° C.

Enrobing on a center having even higher surface temperatures is possible if seeding agents having higher melting points are used and/or the enrobing is followed by rapid cooling.

Another aspect of the invention relates to methods wherein the seeded chocolate composition is further processed into a shaped product without the detrimental formation of fat crystals prior to the step of cooling the seeded chocolate composition to form a shaped chocolate product.

Accordingly, another embodiment of the invention relates to methods comprising the step of depositing the seeded chocolate composition into a mold prior to the cooling. According to one embodiment, the seeded composition is injected into a mold prior to the cooling.

Other embodiments include using the seeded composition in other forming processes such as injection molding, shell molding, spraying, dripping.

According to another embodiment, the seeded composition is spin coated within a hollow mold prior to and/or during the cooling.

The molding can be conventional molding or molding using cold mold surfaces and/or cold plungers. According to one embodiment, the mold has a surface temperature less than 10° C., advantageously less than 5° C., even better less than 0° C. Preferably, the mold has a surface temperature less than 10° C. and the cooling results in a glossy molded product, advantageously less than 5° C., even better less than 0° C.

Preferably, the seeded chocolate composition is enrobed onto an edible product prior to the crystallization of more than about 2.5 wt % of the liquid fat phase, advantageously less than 2 wt %, even better less than 1.5 wt %, and most preferred less than 1 wt %.

According to one embodiment, the seeded chocolate composition is used to form a chocolate coating having a thickness less than 2 mm, preferably less than 1.75 mm, advantageously less than 1.5 mm, even better less than 1.25 and most preferred less than 1.0 mm. Alternatively, a thicker coating can be formed.

A still further aspect of the invention relates to the ability to introduce a controlled target level of temper into a chocolate composition. This allows for better control of the rheology of the chocolate during processing as well as the ability to form low temper and ultra-low temper chocolates useful in manufacturing methods using rapid cooling. The rapid cooling methods advantageously combined with the seeding methods according to the invention are set forth in U.S. patent application Ser. No. 08/782,902 entitled "Methods of Processing Chocolate and Products Produced by Same" by Neil A. Willcocks, Frank W. Earis, Ralph D. Lee, Thomas M. Collins, William R. Palmer and William Harding, filed concurrently, hereby incorporated by reference.

Since the invention allows for better control of rheology during processing, the resultant products can be produced more uniformly. Enrobed products, for example, can be produced having more uniform, thinner chocolate coatings. Accordingly, another aspect of the invention relates to an enrobed edible product comprising:

(a) an edible substrate, and
(b) a chocolate coating enrobed onto the edible substrate, wherein the coating layer around the side and top portions of the enrobed center having an average thickness less than 1.5 mm and a variation in thickness less than 30%. Preferably, the average thickness is less than 1 mm with a variation less than 25%, advantageously less than 20%, even better less than 15% and most preferably less than 10%. Any variation due to decoration is not included in this definition. A decorated top surface does not result in a uniform thickness.

Figure 14A:
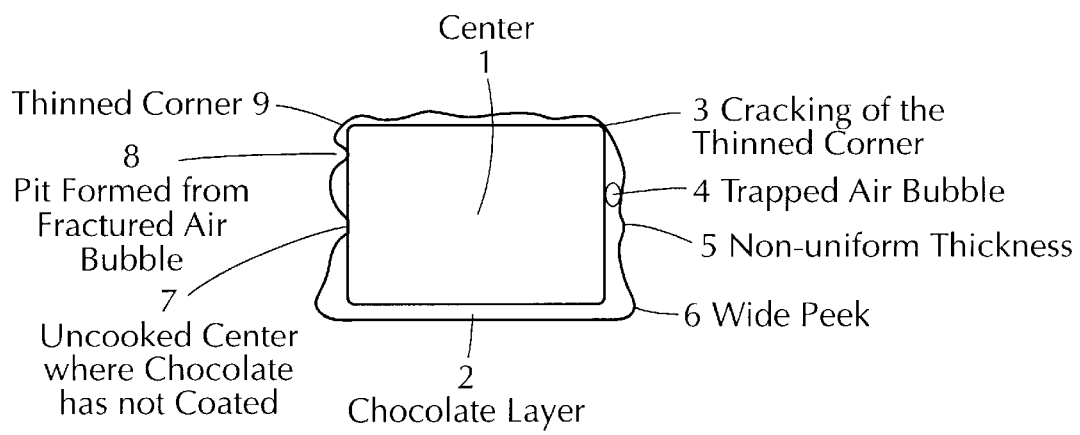
FIG. 14(a) is a cross-sectional view showing the chocolate coating of a chocolate enrobed edible product made by a representative conventional method where the viscosity of the enrobing chocolate is poorly controlled.

FIG. 14(a) illustrates a cross-sectional view of defects typically observed in an enrobed product made using conventional tempering methods. As a result of poor rheological control, such as higher viscosities with conventionally tempered chocolate, defects such as pin-holes, entrapped bubbles, exposed centers, uneven coating thickness and wider feet can be produced. Thinned corners result from excessive shaking used to remove excess chocolate. The corners may be thinned to the extent the coating no longer acts as a barrier causing moisture loss and/or oxidation of the center. Moreover, thinned corners have a higher tendency to crack if subjected to stresses. Thicker chocolate does not flow as easily over the edible center and shows poor wetting characteristics. This can result in the entrapment of air or even uncoated portions of the center. A further consequence of the high chocolate viscosity is a non-uniform coating thickness and possibly wider feet.

Figure 14B:
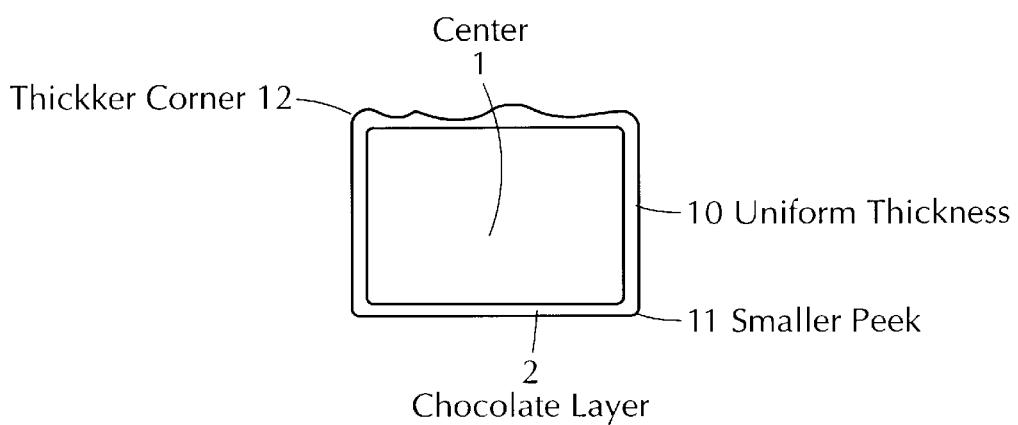
FIG. 14(b) is a cross-sectional view showing the chocolate coating of a chocolate enrobed edible product made by an inventive method according to another embodiment of the invention.

FIG. 14(b) illustrates an enrobed product according to one embodiment of the invention and shows coating having a more uniform thickness and being free of defects.

Figure 15:
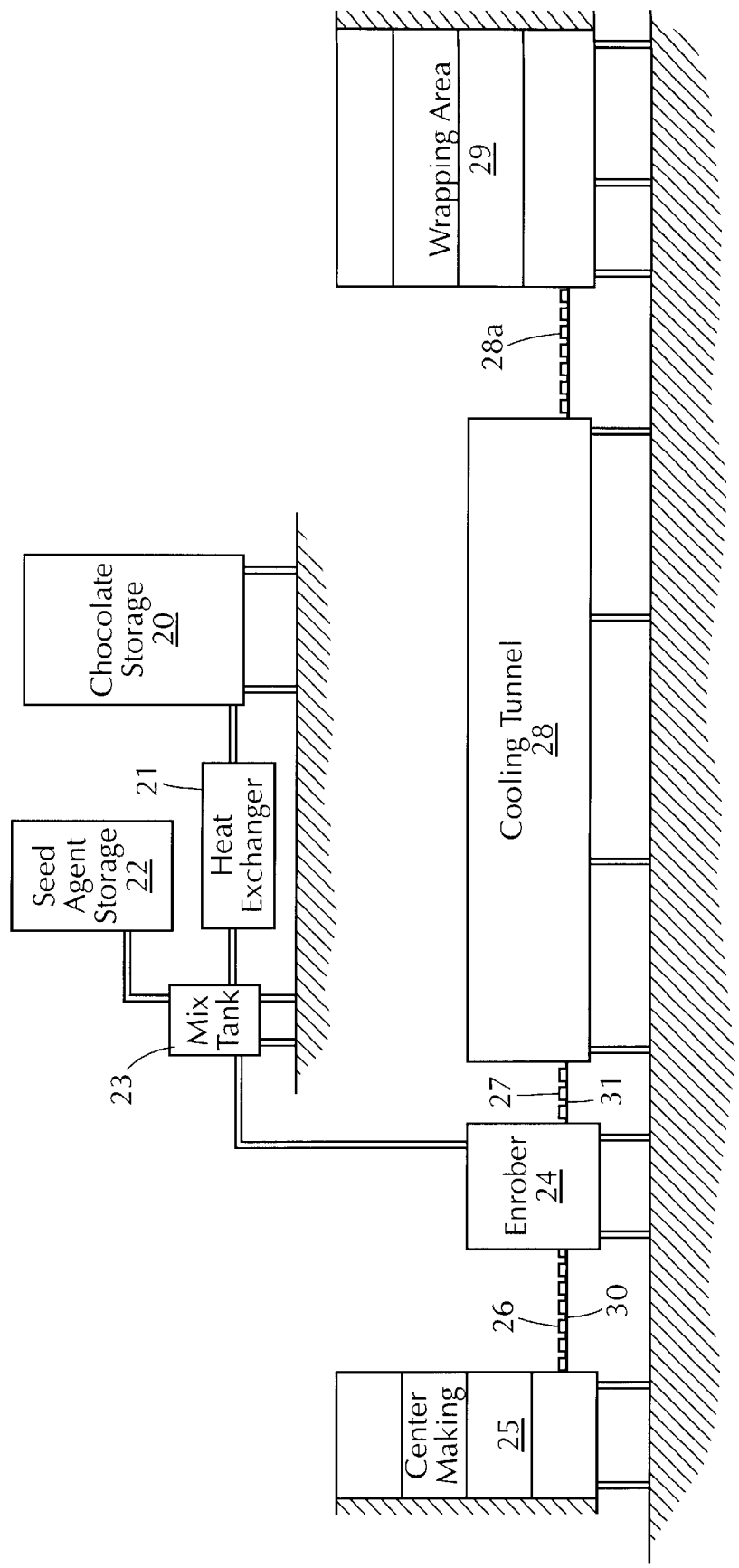
FIG. 15 is a side perspective sectional view of a chocolate confection apparatus according to one embodiment of the invention.

FIG. 15 is a schematical representation of a preferred embodiment of an enrobing process in accordance with the teachings of the present invention. As illustrated in FIG. 15, a center making operation 25 produces centers, such as 26, formed of an edible composition. The formed centers 26 are then transported on a conveyor 30 to an enrober 24 where seeded chocolate is coated upon the centers. The chocolate used in the seeding process is initially stored in a tank 20 at a temperature of typically about 45° C. The chocolate is then pumped through a heat exchanger 21 to cool the chocolate to the seed addition temperature which is typically about 33° C. for cocoa butter seeding agent. The seeding agent is metered from a seed agent storage vessel 22 into a mixing tank 23 where the seeding agent and chocolate are mixed together continuously to create the seeded chocolate. The seeded chocolate is then pumped to the enrober 24 where it is coated upon the centers 26. The coated centers 27 are transferred to another belt conveyor 31 which transports the coated centers into a cooling tunnel 28. In the cooling tunnel 28, the tops, sides and bottoms of the coated centers are cooled so as to harden the chocolate coating. This cooling may be either a conventional cooling tunnel or one which employs rapid cooling. If rapid cooling is employed there may be a transition zone before the cooling as described in U.S. patent application Ser. No. 08/782,902 entitled "Methods of Processing Chocolate and Products Produced by Same" by Neil A. Willcocks, Frank W. Earis, Ralph D. Lee, Thomas M. Collins, William R. Palmer and William Harding, filed concurrently, hereby incorporated by reference. Upon exiting the cooling tunnel, the cooled coated centers 28a are conveyed to a wrapping area 29 for final wrapping and packaging.

One or more of the individual features described above can also in each case form independent solutions according to the invention, and the features of the embodiments can also be combined in any desired way.

EXAMPLES

The following examples are illustrative of some of the products and methods of making the same falling within the scope of the present invention. They are, of course, not to be considered in any way limitative of the invention. Numerous changes and modification can be made with respect to the invention.

Example 1

A milk chocolate composition is prepared using the formulation in Table 1-A below:

TABLE 1-A

| Milk Chocolate Formulation | |
| --- | --- |
| Sugar | 50.00% |
| Cocoa Butter | 20.49% |
| Whole Milk Powder | 18.00% |
| Chocolate Liquor | 11.00% |
| Lecithin | 0.50% |
| Vanillin | 0.01% |

The chocolate mixture is refined to reduce the solid particle sizes to 25 microns (by micrometer) and then loaded into a Petzholdt Conge. The chocolate is dry conged for 6 hours after which lecithin is added. The chocolate is then spun in the conge for 30 minutes. The conged chocolate is transferred into a tank where additional lecithin and cocoa butter are added (standardization) to achieve an apparent viscosity of 20,000 cPs at 45° C. The apparent viscosity is measured by the use of a Brookfield HA type viscometer with TB spindle at 4 RPM. The standardized chocolate is then tempered in a continuous Sollich Solltemper-Turbo Model MSV3000 where the chocolate is cooled from 45° C. to 28° C. with aggressive shear to produce cocoa butter crystals of stable and unstable polymorphs. The tempered chocolate is warmed slightly in the last section of the Solltemper to 31° C. to melt out unstable crystals. The tempered chocolate is at 31° C., has a temper level of 5.3 CTU (°F.) and −0.3 slope and apparent viscosity of 35,000 centipoise (cPs). The temper level is determined by Tricor Tempermeter Model 501. The chocolate is then pumped to the enrober.

The centers to be coated with chocolate are cut, hard, chewy nougat centers 20 mm square by 14 mm tall and are comprised of the composition set forth in Table 1-B (below) and prepared by the method described in *Chocolate, Cocoa and Confectionery: Science and Technology* by Minifie, 3rd Edition, pg. 578–580.

TABLE 1-B

| Hard Chewy Nougat Formulation | |
| --- | --- |
| Egg Albumen | 0.37% |
| Sugar | 43.22 |
| Glucose Syrup | 36.63% |
| Water | 19.78% |

The centers have an average temperature of 24° C. at time of enrobing. The centers are carried into the enrober, a Sollich Enromat, on a wire mesh belt where the liquid tempered chocolate is cascaded from a curtain forming trough to completely coat the centers. Excess chocolate is removed by blowers impinging onto the top surface of the chocolate and by aggressive shaking. The excess chocolate passes through the wire belt into the sump of the enrober where it is recirculated back to the curtain trough. The bottoms of the centers are coated by passing through a wave of tempered chocolate created by a roller under the wire mesh belt. (Alternatively, the centers may be coated in a continuous enrober as described in Minifie, 3rd Ed., pages 216–218). The amount of chocolate enrobed onto the nougat is 35% by weight of the total finished chocolate confection with an average thickness of about 2 mm. The enrobed nougat centers coated with liquid tempered chocolate are transferred from the wire belt to the cooling tunnel by a solid conveyor plastic coated belt (Burrell Polycool PC4, thermal conductivity of 0.004 cal/cm$^2$/° C.). There is a 10 second time period from the time the coated centers exit the enrober to the time they enter the cooling tunnel.

The cooling tunnel is comprised of three sections. The first section comprises an environment with an air temperature of 20° C. with an average convective heat transfer coefficient or H-value of 28 W/m$^{2o}$ C. The coated centers are carried by the conveyor belt over platens situated under the conveyor belt in the first section of the tunnel. These platens are cooled to 15° C. by recirculating cooling media and set the chocolate on the bottoms of the coated centers so that the pieces release from the conveyor belt in 3 minutes to transfer the coated centers to the second cooling tunnel section belt. The second section of the tunnel has an operating temperature of 15° C. and an H-value of 34 W/m$^{2o}$ C. to allow somewhat faster cooling than the first section while not subjecting the chocolate to undue "thermal shock". The coated centers are in the second section of the tunnel for 5 minutes. The last section of the tunnel is 2 minutes long and has an operating temperature of 18° C. and an H-value of 35 W/m$^{2o}$ C. to warm the surface of the set chocolate so that the surface is above the dewpoint of the environment upon exiting the tunnel. The total time in all three sections of the cooling tunnel is 10 minutes.

The resultant finished chocolate confection exiting the tunnel has a glossy surface and is sufficiently firm to be wrapped/packaged without significant deformation or abrasion. The finished pieces are then wrapped or packaged in an environment with a temperature of 20° C. with a dewpoint of 15° C. The finished chocolate confection is also bloom stable.

Example 2

A milk chocolate having a formulation similar to that used in Example 1 is prepared in the manner described in Example 1. The chocolate is cooled in an APV Votator scraped surface heat exchanger from the 45° C. storage temperature to the seed agent addition temperature of 33.5° C. The temperature of the chocolate is maintained at the seed agent addition temperature until enrobing on the centers. Cocoa butter seed agent (CBSA) as prepared from solidified cocoa butter by the cryo-milling method set forth in Hachiya et al., Seeding Effects and Solidification Behavior of Cocoa Butter and Dark Chocolate, 1. Kinetics of Solidification, JAOCS, Vol. 66, (no.12) 1989, has a peak melting point of 35.6° C., average particle size of 5–10 microns (optically measured) and is comprised of 42% Form VI cocoa butter polymorph. The CBSA is added to the chocolate at a 0.8% (by weight) addition rate and well mixed continuously, i.e., the rate of addition of seeding agent is such that the 0.8% is continuously maintained. This addition and mixing is accomplished by means of a small tank equipped with an agitator to which the cooled chocolate and CBSA are added at proportional metered rates. The residence time in the tank is minimized to the amount of time necessary to achieve the desired mixing and does not exceed 5 minutes. The seeded chocolate is at 33.5° C. exiting the mixing tank and is maintained at that temperature by means of controlled temperature jacketing on all systems pumps, pipes, valves and the like until the seeded chocolate is applied to the centers. The temper level of the chocolate exiting the mix tank is 4.7 CTU and 0.0 slope as measured by Tricor Tempermeter and an apparent viscosity of 23,000 cPs. The seeded chocolate is delivered to the enrober in 5 minutes or less.

The centers are comprised of two layers, the bottom layer of nougat is 10 mm thick similar to that in Example 1, overlaid with a 4 mm thick layer of caramel (creating a 14 mm thick center) comprised of the formula in Table 3-A prepared in the manner similar to that described in Minifie, 3rd Ed., pp 533–537.

TABLE 2-A

Soft Caramel Formulation

| | |
|---|---|
| Corn Syrup | 40.00% |
| Sweetened Cond. Whole Milk | 37.40% |
| Sugar | 13.50% |
| Milk Butter | 5.19% |
| Water | 3.40% |
| Salt | 0.50% |
| Flavorings | 0.01% |

The dimensions of the centers are 20 mm square and 14 mm high. The centers have an average temperature of 22° C. at time of enrobing. The centers are enrobed with the seeded chocolate in a Sollich Enromat in the manner as described in Example 1. The amount of chocolate enrobed onto the centers is 35% by weight of the total finished chocolate confection with an average thickness of about 2 mm. The coated centers are then cooled in the same cooling tunnel as set forth in Example 1. The resultant finished chocolate confection exiting the tunnel has a glossy surface, is bloom stable and is sufficiently firm to be wrapped/packaged without significant deformation or abrasion.

Example 3

Chocolate is prepared as set forth in Example 1. CBSA is prepared as set forth in Example 2 and has a peak melt point of 35.7° C., is comprised of 37% Form VI Cocoa butter polymorph, and has a particle size of 5–10 micron. The chocolate is cooled to 33.2° C. in a manner similar to Example 2 and is added batch-wise to one of two 10,000 kg capacity, temperature controlled (33.2° C.), agitated tanks. The CBSA is added simultaneously to the tank. The tank contains 9,900 kg of cooled chocolate and 100 kg of CBSA when filled. Upon filling the first tank, the flow of chocolate and CBSA changes to the second tank. This cycle continues alternating tanks so that the feed of CBSA and chocolate is maintained in a continuous fashion. This method of blending is commonly known as "batch-continuous". The use rate of seeded chocolate is approximately 2000 kg/h, therefore the average hold time in each tank is 2.5 hours with total use time of 5 hours. The seeded chocolate maintains a temper level exiting the tanks of 5.8 CTU and –0.5 slope and a viscosity of 25,000 cPs. Centers are prepared, enrobed and cooled as set forth in Example 2. The resultant finished chocolate confection exiting the tunnel has a glossy surface, is bloom stable and is sufficiently firm to be wrapped/packaged without significant deformation or abrasion.

Example 4

Chocolate and centers are prepared as in Example 2. The centers are enrobed in a manner similar to Example 1 with the exception that the enrober blowers and shakers are operated such that the chocolate percentage on the finished centers is 25% by weight with an average thickness of 1.5 mm. A thin chocolate layer without defects such as voids or pinholes is formed as a result of the lower viscosity of the seeded chocolate (23,000 cPs) as compared to conventional tempering (35,000 cPs).

Example 5

A dark chocolate composition is prepared using the formulation in Table 5-A below:

TABLE 5-A

Dark Chocolate

| | |
|---|---|
| Sugar | 50.00% |
| Chocolate Liquor | 36.30% |
| Cocoa Butter | 11.00% |
| Anhydrous Milkfat | 2.00% |
| Lecithin | 0.50% |
| Vanillin | 0.20% |

The chocolate is refined, conged and standardized as set forth in Example 1. The chocolate is standardized at a temperature of 40° C. At the standardizing step a seeding agent is added at the rate of 0.5% by weight and then transferred to a hold tank prior to use. The seeding agent is SOS prepared by cryo-milling as set forth in Hachiya et al. The seeding agent has a peak melt point of 43° C. and average particle size of 5–10 microns. The seeded chocolate is at 40° C. exiting the mixing tank and is maintained at that temperature by means of controlled temperature jacketing on all systems pumps, pipes, valves and the like until the seeded chocolate is applied to the centers. The temper level of the chocolate exiting the mix tank is 4.6 CTU and 0.1 slope as measured by Tricor Tempermeter and a viscosity of 15,000 cPs.

Centers are prepared as in Example 1. The centers are cooled to an average temperature of 40° C. prior to enrobing. Typical chocolate is melted or detempered by such warm centers. The seeding agent with a high melting point allows the enrobing of warmer centers. The centers are enrobed in a manner similar to Example 3 to a final chocolate percentage of 20% with an average thickness of 1.0 mm. As in Example 3, this thin chocolate layer without defects such as voids or pinholes is only possible because of the lower viscosity of the warmer, seeded chocolate (15,700 cPs) as compared to conventional tempering (35,000 cps).

The centers are then rapidly cooled to avoid slumping or deformation of the center. The coated centers pass through a transition zone where the environmental conditions are 31° C. and −20° C. dewpoint. The air pressure in the transition zone is slightly higher than both the enrober and tunnel. This reduces the transfer of cool air from the tunnel to the enrober and the transfer of moist air from the enrober to the tunnel. The coated centers then enter the cooling section of the tunnel. The environment in the tunnel is at a temperature of −15° C. with a dewpoint of −20° C. The average H-value above the belt in the tunnel is 125 W/m$^{2°}$ C. The conveyor is a thin belt as described in Example 1 which rides on platens cooled by refrigerated liquid to a temperature of −15° C. The platens extend into the tunnel to the point where the coated centers and belt have been exposed to the cold platens for 1 minute. The remainder of the tunnel (2 minutes and 45 seconds) is not equipped with cooling platens. The total time in the cooling section of the tunnel is 3 minutes and 45 seconds. Upon exiting the cooling section, the cooled coated centers release from the belt, transfer to another conveyor and then enter the rewarm zone. The rewarm zone has a controlled atmosphere of 12° C., with a dewpoint of −20° C. and an average H-value of 75 W/m$^{2°}$ C. for 30 seconds. The surface temperature of the finished chocolate confection is raised to 7° C., which is above the dewpoint of the environment at the exit of the rewarm zone. The resultant finished chocolate confection exiting the tunnel has a glossy surface and is sufficiently firm to be wrapped/packaged without significant deformation or abrasion. The finished chocolate confection is then wrapped or packaged in an environment with a temperature of 20° C. with a dewpoint of 6° C. The finished chocolate confection is also bloom stable.

Example 6

A milk chocolate having a formulation similar to that used in Example 1 was prepared in the manner described in Example 1. The chocolate was cooled in a Sollich automatic tempering machine to 33° C. CBSA with a peak seed melt temperature of 36.0° C., 43% Form VI cocoa butter polymorph and average particle size of 5–10 micron was added batchwise to a mixed tank to an addition percentage of 1.0%. The chocolate was pumped from the tank to the enrober. The chocolate system, tanks, pipes valves and the like, were maintained at the seed addition temperature of 33° C. The seeded chocolate exiting the mix tank had a temper level of 6.8 CTU and −1.0 slope and an apparent viscosity of 21,000 cPs.

The centers were comprised of two layers. The bottom layer of nougat was 5 mm thick similar to that in Example 1, overlaid with a 12 mm thick layer of caramel/peanut matrix (creating a 17 mm thick center) comprised of the formula in Table 6-A prepared in the manner similar to that described in Minifie, 3rd Ed., pp 533–537 with the peanuts being added after the caramelization step.

TABLE 6-A

Soft Caramel with Peanuts Formulation

| | |
|---|---|
| Corn Syrup | 32.00% |
| Roasted Peanut Splits | 24.00 |
| Sweetened Cond. Whole Milk | 28.00% |
| Sugar | 9.00% |
| Milk Butter | 4.00% |
| Water | 2.50% |
| Salt | 0.50% |

The dimensions of the centers was 100 long by 25 mm wide by 17 mm high. The centers had an average temperature of 22° C. at time of enrobing. The centers were enrobed with seeded chocolate in a Sollich Enromat in the manner as described in Example 1 to a final chocolate percentage of 35% with an average thickness of 3.0 mm (high density centers result in thicker coating at same percentage when compared to Example 2). The coated centers were then cooled in a Sollich chocolate cooling tunnel. The cooling tunnel had three sections. The first section had a Ameraal Ropanyl belt sliding over the top of cooling platens cooled to a temperature of 13° C. The air in the first tunnel had an average temperature of 12° C. and an average H-value of about 35 W/m$^{2°}$ C. The residence time in this tunnel section was 7 minutes. The coated centers released from the first section belt and were transferred to a belt which traversed the final two sections of the tunnel. There was no cooling under the belt in the second and third sections. The second section had an operating temperature of 12° C. and an average H-value of about 35 W/m$^{2°}$ C. The third (final) section of the tunnel was 12° C. and an average H-value of 42 W/m$^{2°}$ C. The residence time in section 2 was 1.5 minutes, and 1.5 minutes in section 3. The cooled chocolate confection exited the tunnel into an environment controlled to 15° C. ambient temperature with a 7° C. dewpoint. The finished confections had fair gloss and hardness was well above the minimum required for good wrapping/packaging. The finished chocolate confections were also bloom stable.

Example 7

Seeded chocolate was prepared in a manner identical to that set forth in Example 6 with the exception that the enrober blowers and shakers were operated such that the chocolate percentage on the finished centers was equivalent to 25% by weight of a standard nougat confection. In order to minimize the effect of center variation and to simplify the handling of potentially difficult samples, plastic (ultra-high molecular weight polyethylene) centers were used. The overall size of the centers were 120.5 mm long by 28.0 mm wide by 16.4 mm high. The average thickness of the chocolate was 2.0 mm. The resultant thin chocolate layer without defects such as voids or pinholes was only possible because of the lower viscosity of the seeded chocolate (26,000 cPs) as compared to conventional tempering (35,000 cPs).

Example 8

Chocolate is prepared as set forth in Example 1. CBSA with a peak seed melt point temperature of 36.2° C., 44% cocoa butter Form VI and an average particle size of 5–10 microns is added to chocolate cooled to 33° C. in the manner of Example 2 at an addition rate of 0.03%. This results in a temper level of 4.5 RTU, ultra-low temper. The seeded chocolate has a viscosity of 24,000 cPs as compared to its viscosity of 17,000 cPs at 40° C. Centers are prepared and enrobed in the manner of Example 1 to a final chocolate percentage of 35% and an average thickness of 2 mm. The coated centers are then rapidly cooled as set forth in Example 5 except with an operating temperature of −25° C. and rewarmed for 1 minute. The resultant finished chocolate confection exiting the tunnel has a glossy surface, is bloom stable and is sufficiently firm to be wrapped/packaged without significant deformation or abrasion.

Example 9

A reduced-fat (23.5% fat) chocolate is prepared in the manner taught by U.S. Pat. No. 5,464,649 Example 3. The chocolate is then cooled to 33° C. and seeded with 0.01% CBSA as in Example 8 to yield a temper level of 3.5 RTU. The seeded chocolate is enrobed onto centers as set forth in Example 8. The seeded chocolate at 33° C. has an apparent viscosity of 35,000 cPs versus 25,000 at 40° C. The coated centers are rapidly cooled as set forth in Example 5. The resultant finished fat chocolate confection exiting the tunnel has a glossy surface, is bloom stable and is sufficiently firm to be wrapped/packaged without significant deformation or abrasion.

Example 10

Milk Chocolate (not United States Standard of Identity) is prepared by the method set forth in Example 1 using the formulation in Table 10-A below:

TABLE 10-A

| Milk Chocolate Formulation with Coberine | |
|---|---|
| Sugar | 50.00% |
| Cocoa Butter | 17.49% |
| Coberine | 3.00% |
| Whole Milk Powder | 18.00% |
| Chocolate Liquor | 11.00% |
| Lecithin | 0.50% |
| Vanillin | 0.01% |

Coberine is a cocoa butter equivalent originally invented and patented (1961) by Unilever that is in widespread use in milk chocolate, where allowed, outside the United States. The chocolate is seeded in the manner of Example 2 at a 0.9% addition rate with CBSA having a peak seed melting temperature of 35.8° C. and 39% cocoa butter Form VI. The seeded chocolate has a temper level of 5.3 CTU and −0.3 slope and a viscosity of 26,000 cPs compared to 20,000 cPs at 40° C. Centers are prepared, enrobed and cooled as set forth in Example 1. The resultant finished chocolate confection exiting the tunnel has a glossy surface, is bloom stable and is sufficiently firm to be wrapped/packaged without significant deformation or abrasion.

Example 11

Chocolate is prepared as set forth in Example 1. The chocolate is cooled to 33.5° C. and seeded at a 1.0% addition rate with CBSA having a 35.7° C. peak melt temperature, 37% cocoa butter form VI, and an average particle size of 5–10 microns. The chocolate is seeded in the manner of Example 3 to provide a large reservoir of seeded chocolate for use in two operations. The seeded chocolate has a viscosity of 23,000 cPs (versus 17,000 at 40° C.) which is appropriate for both enrobing and molding operations.

The first operation is enrobing and cooling the centers as set forth in Example 3. The second operation is a conventional tablet molding line. The seeded chocolate is pumped to a depositor where the chocolate is precisely metered into polycarbonate molds with a desired highly detailed mold design. The delayed viscosity increase of seeded chocolate is a production advantage as build-up in the depositor hopper is eliminated. The line shutdowns of 2–3 hours with conventional tempering which require that the depositor hopper be emptied and heated because of viscosity increases are eliminated. The lower viscosity (without the need for the addition of extra cocoa butter) of the chocolate aids in wetting the surface of the mold having very fine detail and allows air to escape reducing air bubble defects. The low viscosity chocolate spreads more easily and requires less shaking to level the chocolate. This allows the mold to be filled more rapidly and completely than normal. Moreover, a certain amount of "freeboard" above the chocolate is typically employed to reduce splashing out of molds during aggressive shaking. As a result of the present invention, less shaking is required allowing for a reduced freeboard and resulting in a reduced meniscus on the back of the molded product. The filled molds are then cooled in a tunnel at approximately 14° C. and with an average H-value of 40 $W/m^{2°}$ C. for 20 minutes. The chocolate tablets are then knocked out of the molds and wrapped. The finished chocolate tablets have a very high level of gloss, reduced bottom meniscus and are bloom stable. The end result is a chocolate tablet with a reduced meniscus on the bottom which typically results in unsightly chocolate crumbs or threads when the package is opened by the consumer.

Example 12

A lower fat (about 25% fat) milk chocolate composition is prepared using the formulation in Table 12-A below:

TABLE 12-A

| Lower Fat Milk Chocolate Formulation | |
|---|---|
| Sugar | 55.00% |
| Cocoa Butter | 13.49% |
| Whole Milk Powder | 20.00% |
| Chocolate Liquor | 11.00% |
| Lecithin | 0.50% |
| Vanillin | 0.01% |

The chocolate mixture is refined to reduce the solid particle sizes to 30 microns (by micrometer) and then loaded into a Petzholdt Conge. The chocolate is dry conged for 8 hours after which lecithin is added. The chocolate is then spun in the conge for 30 minutes. The conged chocolate is transferred into a tank where additional lecithin and cocoa butter are added (standardization) to achieve an apparent viscosity of 25,000 cPs at 45° C. The chocolate is cooled to 33.1° C. and then seeded as in Example 8 with 0.7% CBSA with a peak melt temperature of 35.4° C. and 37% cocoa butter Form VI to yield a temper level of 5.0 CTU and −0.3 slope and a viscosity of 28,000 cPs. The seeded chocolate is then deposited into a half mold which is then coupled with another half mold and spun to produce a hollow molded article as described in Minifie, 3rd Ed. pg. 200. The filled, spun molds are then cooled in a tunnel at approximately 14° C. and an average H-value of 40 W/m$^{2°}$ C. for 20 minutes. The hollow chocolate molded confection is then demolded and wrapped. The use of seeded chocolate in this example allows for the use of much lower fat chocolate than would typically be used for a spin-molded confection. Spin-molding requires good wetting of the interior surface of the mold and good spreading within the mold. Seeded chocolate does not start to increase in viscosity until well after depositing into the mold. This results in a much more uniform interior and reduced defects in the formed shell.

Example 13

A reduced-fat (23.5% fat) chocolate is prepared in the manner taught in Example 3 of U.S. Pat. No. 5,464,649. The chocolate is then cooled to 33.8° C. and seeded as in Example 8 with 1.0% CBSA with a peak melt temperature of 35.7° C. and 38% cocoa butter Form VI to yield a temper level of 7.5 CTU and −1.0 slope. This seeded chocolate has a viscosity of 28,000 cPs. The seeded chocolate is then deposited onto a belt directly in the form of a chocolate drop and rapidly cooled as set forth in Example 5 to minimize any slumping or deformation. Upon exiting the tunnel, the finished chocolate drop is bloom stable and is sufficiently firm for wrapping and/or packaging.

Example 14

A reduced-fat (23.5%) chocolate is prepared in the manner taught in Example 3 of U.S. Pat. No. 5,464,649. The chocolate is then cooled to 33° C. and seeded as in Example 2 with 0.8% CBSA with a peak melt temperature of 36.1° C. and 42% cocoa butter Form VI to yield a temper level of 4.8 CTU and −0.2 slope. This seeded chocolate has a viscosity of 26,000 cPs. The seeded chocolate is then deposited as set forth in Example 11 except that the chocolate is deposited into a pre-warmed mold to 33° C. The warmed mold and the lower viscosity (without the addition of extra cocoa butter) combine to improve further on the benefits set forth in Example 11. The filled molds are then cooled in a tunnel at approximately 14° C. and with an average H-value of 40 W/m$^{2°}$ C. for 22 minutes. The chocolate tablets are then knocked out of the molds and wrapped. The finished chocolate tablets have a very high level of gloss, reduced bottom meniscus and are bloom stable.

Example 15

Chocolate is prepared, cooled and seeded as set forth in Example 2. Centers are prepared and enrobed as in Example 2. The coated centers are rapidly cooled as set forth in Example 5. The finished chocolate confections are bloom stable, glossy and sufficiently firm to be wrapped/packaged.

Example 16

Chocolate is prepared, cooled and seeded as set forth in Example 3. Centers are prepared and enrobed as in Example 2. The coated centers are rapidly cooled as set forth in Example 5. The finished chocolate confections are bloom stable, glossy and sufficiently firm to be wrapped/packaged.

Example 17

A dark chocolate is prepared, cooled and seeded as set forth in Example 5. This seeded chocolate is at 40° C. and has a viscosity of 15,000 cPs. The seeded chocolate is then deposited as set forth in Example 11 except that the mold is cooled to −20° C. The reduced viscosity of chocolate and the hotter temperature increases the wetting ability of the chocolate as it contacts the surface of the mold and results in the achievement of higher detail than if the chocolate had not been hot. The advantage of the cold mold is significantly reduced setting time which allows either faster operation or smaller, more compact production equipment. The filled molds are then cooled in a tunnel at approximately 11° C. and an average H-value of 50 W/m$^{2°}$ C. for 23 minutes. The chocolate tablets are then knocked out of the molds and wrapped. The finished chocolate tablets have a very high level of gloss, a high degree of detail and are bloom stable.

Example 18

A dark chocolate is prepared, cooled and seeded as set forth in Example 5. This seeded chocolate is at 40° C. and has a viscosity of 15,000 cPs. The seeded chocolate is then injected into an apparatus as taught in U.S. Pat. No. 4,426,402. Whereas the reference refers to the use of hot chocolate, no mention is made of temper for that chocolate. This example uses seeded hot chocolate which will result in good filling of the mold because of its low viscosity while providing a better finished product gloss and bloom stability. The formed chocolate parts may then be further cooled as set forth in Example 1.

The above description of the invention is intended to be illustrative and not limiting. Various changes, combinations or modifications in the embodiments described may occur to those skilled in the art. These can be made without departing from the spirit or scope of the invention.

What is claimed is:

1. A method of processing a chocolate composition containing solid particles dispersed throughout a continuous fat phase having a solidification temperature comprising the steps of:
   (a) adding cocoa butter seeding agents having a seed melting temperature to a chocolate composition comprising a liquid fat phase at a seed addition temperature thereby forming a seeded chocolate composition;
   (b) maintaining the seeded chocolate composition within a processing temperature range without detrimental crystallization of the liquid fat phase in a suspended animation state for a period of time greater than 1 minute, wherein the seeded chocolate composition has a viscosity value maintainable for 1 hour without an exponential viscosity increase, and without a viscosity increase caused by said detrimental crystallization, said processing temperature range being between said solidification temperature and said seed melting temperature; and
   (c) cooling said seeded chocolate composition to a setting temperature below the solidification temperature to form a set chocolate product.

2. The method according to claim 1, wherein said seed addition temperature is above said solidification temperature and wherein said seeding agents comprise cocoa butter in the form V polymorph, form VI polymorph or mixtures thereof.

3. The method as claimed in claim 1, wherein the seeded chocolate composition is maintained within the processing temperature range without detrimental crystallization of the liquid fat phase for a period of time greater than 5 minutes.

4. The method of claim 1, wherein said seeded chocolate composition is subjected to a force sufficient to cause flow.

5. The method of claim 1, wherein said seeded chocolate composition is subjected to a force sufficient to cause flow, wherein said flow includes spraying, atomization, injection moulding, pouring, enrobing, extrusion, shaping, spin moulding, pumping, dripping, depositing, aeration with air or other gases, molding or combinations thereof.

6. The method of claim 1, wherein the apparent viscosity of the seeded composition during step(c) varies less than 20% and increases less than 10% prior to cooling to said solidification temperature.

7. The method of claim 1, wherein the increase in apparent viscosity of the seeded chocolate composition attributable to crystallization of the fat phase varies less than 30% prior to cooling to below said solidification temperature.

8. The method of claim 1, wherein said chocolate composition comprises less than 32 wt % fat.

9. The method of claim 1, wherein said seed addition temperature is at least 1° C. greater than said solidification temperature.

10. The method of claim 1, wherein said seed addition temperature is at least 2° C. greater than said solidification temperature.

11. The method of claim 1, wherein said seed addition temperature is at least 3° C. greater than said solidification temperature.

12. The method of claim 1, wherein said seed addition temperature is at least 4° C. greater than said solidification temperature.

13. The method as claimed in claim 1, wherein the seeding agents have a seed melting temperature at least 1° C. higher than the seed addition temperature.

14. The method as claimed in claim 1, wherein the seeding agents are substantially pure and have a seed melting temperature at least 0.5° C. higher than the seed addition temperature.

15. The method as claimed in claim 1, further comprising the step of enrobing said seeded chocolate composition onto an edible product prior to the step of cooling the seeded chocolate composition to form an enrobed product having a set chocolate coating.

16. The method as claimed in claim 1, wherein said seeded chocolate is enrobed onto an edible center having a surface temperature at least 2° C. higher then the solidification temperature.

17. The method as claimed in claim 1, wherein said seeded chocolate is enrobed onto an edible center having a surface temperature at least 3° C. higher then the solidification temperature.

18. The method as claimed in claim 1, wherein said seeded chocolate is deposited into a mold prior to said cooling.

19. The method as claimed in claim 1, wherein said seeded composition is deposited into a mold prior to said cooling.

20. The method as claimed in claim 1, wherein said seeded composition is injected into a mold prior to said cooling.

21. The method as claimed in claim 1, wherein said seeded composition is spin coated within a hollow mold prior to said cooling.

22. The method of claims 19, 20, or 21, wherein said mold has a surface temperature less than 10° C.

23. The method of claims 19, 20, or 21, wherein said mold has a surface temperature less than 10° C. and said cooling results in a glossy molded product.

24. The method of claim 1, wherein said seeded chocolate composition is enrobed onto an edible product prior to said cooling and has an initial seeding viscosity immediately after adding said seeding agents and an enrobing viscosity during the step of enrobing said seeded chocolate composition onto said edible product, wherein the ratio of initial seeding viscosity to the enrobing viscosity is greater than 0.8 and less than 1.2.

25. The method as claimed in claim 1, wherein said seeded chocolate composition is further processed into a shaped product without detrimental crystallization prior to the step of cooling the seeded chocolate composition to form a shaped chocolate product.

26. The method as claimed in claim 1, wherein said seeded chocolate composition is enrobed onto an edible product prior to the crystallization of more than about 1% of the liquid fat phase.

27. The method as claimed in claim 1, wherein said seeding agents are added in an amount ranging from about 0.05 to 5% by weight to the chocolate composition.

28. The method as claimed in claim 1, wherein the seeding agents comprise substantially pure cocoa butter.

29. The method of claim 1, wherein the seeding agents comprise greater than 30 wt % the Form VI polymorph of cocoa butter.

30. The method as claimed in claim 1, wherein the seeding agents are in the form of particles having an average diameter less than 40 microns.

31. The method of claim 30, wherein said particles have an outer surface layer comprising cocoa butter.

32. The method of claim 31, wherein said outer surface layer comprises Form VI polymorph of cocoa butter.

33. The method of claim 1, wherein said seeding agents are in combination with other solid additives prior to said step of adding.

34. The method of claim 33, wherein said solid additives are selected from the group consisting of cocoa solids, sugar, milkfat or mixtures thereof.

35. The method of claim 1, wherein said seeding agents are dispersed in a slurry prior to adding to said chocolate composition.

36. The method of claim 35, wherein said slurry comprises a lipid or hydrophilic carrier or mixtures thereof.

37. The method of claim 36, wherein said hydrophilic carrier is selected from the group consisting of water, sugar syrup and mixtures thereof.

38. The method as claimed in claim 1, wherein the set chocolate product comprises a crystalline fat phase containing polymorphs V, VI and mixtures thereof.

39. The method of claim 1, wherein said chocolate composition has a fat content less than 24.5 wt %.

40. The method of claim 39, wherein said chocolate forms a chocolate coating having a theckness legs than 2 mm.

41. The method as claimed in claims 1, further comprising the step of enrobing said seeded chocolate composition onto an edible product prior to said step of cooling the seeded chocolate composition to form an enrobed product having a set chocolate coating, wherein said edible center of product has a surface temperature at least 1° C. greater than said solidification temperature during said enrobing.

* * * * *

UNITED STATES PATENT AND TRADEMARK OFFICE
CERTIFICATE OF CORRECTION

PATENT NO. : 6,391,356 B1
DATED : May 21, 2002
INVENTOR(S) : Neil A. Willcocks et al.

It is certified that error appears in the above-identified patent and that said Letters Patent is hereby corrected as shown below:

<u>Title page,</u>
Insert item -- [74]    *Attorney, Agent, or Firm* - Fitzpatrick, Cella, Harper & Scinto --.
Item [56], OTHER PUBLICATIONS, after "Koyano, T. et al." "seedings" should read -- seeding effects --.

<u>Column 1,</u>
Line 28, "solids" should read -- solid --.

<u>Column 3,</u>
Line 53, "viscosity" should read -- viscosity with --.

<u>Column 4,</u>
Line 5, "Theological" should read -- rheological --;
Line 32, "decrease" should read -- decreases --;
Line 48, "phase" should read -- phase is --.

<u>Column 8,</u>
Line 18, close up right margin;
Line 19, close up left margin;
Line 51, "represent" should read -- represents --.

<u>Column 9,</u>
Line 9, "invention." should read -- invention; and --.

<u>Column 13,</u>
Line 55, delete "If a chocolate does not show an inflection"
Line 56, delete "during determination."

<u>Column 14,</u>
Line 19, "Theological" should read -- rheological --.

<u>Column 19,</u>
Line 45, "less than less than" should read -- less than --;
Line 49, "23%," should read -- 23 wt%, --.

<u>Column 22,</u>
Line 17, "wherein;" should read -- wherein: --.

UNITED STATES PATENT AND TRADEMARK OFFICE
CERTIFICATE OF CORRECTION

PATENT NO.   : 6,391,356 B1
DATED        : May 21, 2002
INVENTOR(S)  : Neil A. Willcocks et al.

It is certified that error appears in the above-identified patent and that said Letters Patent is hereby corrected as shown below:

Column 23,
Line 32, "then" should read -- than --;
Line 37, "use" should read -- use of --.

Column 31,
Line 21, "systems" should read -- systems, --.

Column 32,
Line 13, "pipes" should read -- pipes, --;
Line 42, "at" should read -- at the --;
Line 51, "and" should be deleted.

Column 37,
Line 13, "step(c)" should read -- step (c) --;
Line 48, "then" should read -- than --;
Line 52, "then" should read -- than --.

Column 38,
Line 58, "theckness legs" should read -- thickness less --;
Line 59, "claims 1," should read -- claim 1 --.

Signed and Sealed this

Twenty-ninth Day of July, 2003

JAMES E. ROGAN
*Director of the United States Patent and Trademark Office*